(12) United States Patent
Oh et al.

(10) Patent No.: US 11,252,336 B2
(45) Date of Patent: Feb. 15, 2022

(54) ELECTRONIC DEVICE OBTAINING SKIN IMAGE AND METHOD OF CONTROLLING THE SAME

(71) Applicant: SAMSUNG ELECTRONICS CO., LTD., Suwon-si (KR)

(72) Inventors: Youngjae Oh, Suwon-si (KR); Hyoungseon Choi, Suwon-si (KR); Sangkyung Lee, Suwon-si (KR); Jiwoon Jung, Suwon-si (KR); Joonho Kim, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

(21) Appl. No.: 16/810,401

(22) Filed: Mar. 5, 2020

(65) Prior Publication Data

US 2020/0382689 A1  Dec. 3, 2020

Related U.S. Application Data

(60) Provisional application No. 62/855,204, filed on May 31, 2019.

(30) Foreign Application Priority Data

Sep. 10, 2019 (KR) .......................... 10-2019-0112432
Sep. 25, 2019 (KR) .......................... 10-2019-0118054

(51) Int. Cl.
*H04N 5/235* (2006.01)

(52) U.S. Cl.
CPC ......... *H04N 5/2352* (2013.01); *H04N 5/2351* (2013.01)

(58) Field of Classification Search
CPC .......................... H04N 5/2352; H04N 5/2351
See application file for complete search history.

(56) References Cited

U.S. PATENT DOCUMENTS 9,288,374 B1 * 3/2016 Cooper .............. H04N 5/23225
9,819,852 B2 * 11/2017 Prentice ............ H04N 5/23245
(Continued)

FOREIGN PATENT DOCUMENTS

| JP | 2005-210485 A | 8/2005 |
| JP | 2008-109412 A | 5/2008 |

(Continued)

OTHER PUBLICATIONS

International Search Report (PCT/ISA/210) issued by the International Searching Authority in International Application No. PCT/KR2020/007023, dated Sep. 7, 2020.
(Continued)

*Primary Examiner* — Richard A Hansell, Jr.
(74) *Attorney, Agent, or Firm* — Sughrue Mion, PLLC

(57) ABSTRACT

Disclosed are an electronic device obtaining skin images and a method of controlling the same. According to an embodiment, an electronic device comprises at least one camera, at least one light source, and at least one processor configured to control the at least one camera to capture a user image, identify a brightness of a facial skin image from the user image, determine at least one of a capture control parameter of the at least one camera and an output control parameter of the at least one light source, based on the identified brightness, and control the at least one camera to recapture the user image according to the at least one of the determined capture control parameter and the determined output control parameter of the light source.

15 Claims, 16 Drawing Sheets

(56) References Cited

U.S. PATENT DOCUMENTS

| | | | |
|---|---|---|---|
| 10,558,848 B2* | 2/2020 | Rivard | G06K 9/00268 |
| 2006/0044422 A1 | 3/2006 | Miyazaki | |
| 2008/0101785 A1 | 5/2008 | Kirisawa et al. | |
| 2009/0185358 A1* | 7/2009 | Liu | G03B 15/02 |
| | | | 362/3 |
| 2010/0271507 A1* | 10/2010 | Hung | H04N 5/23219 |
| | | | 348/231.99 |
| 2011/0150451 A1 | 6/2011 | Kubota | |
| 2017/0035327 A1* | 2/2017 | Yuen | A61B 5/02438 |
| 2017/0249501 A1* | 8/2017 | Van Der Sijde | G03B 15/05 |
| 2017/0272638 A1* | 9/2017 | Lee | G01S 17/08 |
| 2017/0324933 A1* | 11/2017 | Alrod | H04N 7/142 |
| 2018/0005057 A1* | 1/2018 | Lee | G06K 9/00255 |
| 2018/0137341 A1* | 5/2018 | Jeong | G06K 9/00228 |
| 2019/0222769 A1* | 7/2019 | Srivastava | H04N 5/232945 |

FOREIGN PATENT DOCUMENTS

| | | | |
|---|---|---|---|
| JP | 2009182461 A * | 8/2009 | |
| KR | 10-1999-0054522 A | 7/1999 | |
| KR | 10-2010-0125983 A | 12/2010 | |
| KR | 10-2013-0099642 A | 9/2013 | |
| KR | 10-2016-0110894 A | 9/2016 | |
| KR | 10-2018-0080140 A | 7/2018 | |
| KR | 10-2018-0134624 A | 12/2018 | |

OTHER PUBLICATIONS

Written Opinion (PCT/ISA/237) issued by the International Searching Authority in International Application No. PCT/KR2020/007023, dated Sep. 7, 2020.

* cited by examiner

ELECTRONIC DEVICE OBTAINING SKIN IMAGE AND METHOD OF CONTROLLING THE SAME

CROSS-REFERENCE TO RELATED APPLICATION(S)

This application is based on and claims priority under 35 U.S.C. 119 to U.S. Patent Application No. 62/855,204, filed on May 31, 2019, in the United States Patent and Trademark Office, Korean Patent Application No. 10-2019-0112432, filed on Sep. 10, 2019, in the Korean Intellectual Property Office, and Korean Patent Application No. 10-2019-0118054, filed on Sep. 25, 2019, in the Korean Intellectual Property Office, the disclosures of which are incorporated herein by reference in their entireties.

BACKGROUND

Field

Various embodiments of the disclosure relate to an electronic device obtaining skin images and a method of controlling the same.

Description of Related Art

More and more services and additional functions are being provided through electronic devices, e.g., smart mirrors. For example, a user may carry out diagnosis on her skin via an electronic device, e.g., a smart mirror. As such, steadily increasing demand for home skin diagnosis and beauty devices calls for technology for skin analysis. Therefore, a need exists for methods of skin image acquisition that ensures accurate skin analysis in various home lighting environments.

An electronic device for analysis based on captured skin images requires skin images captured under an adequate level of lighting for the purpose of accurate analysis of skin condition. If light is too high or low when the image is captured, the quantity of light the image sensor may detect is excessive or insufficient and, thus, the captured skin image may not contain sufficient information necessary for skin analysis. This may fail to deliver accurate analysis for the user's skin condition. In other words, if an external light, which is not under the control of an electronic device (e.g., the electronic device 101 of FIG. 1), is near the user whose skin condition is being measured, it may be hard to uniformly obtain images for ensuring skin analysis accuracy due to influence by the external light. Light absorption and reflection differ depending on users' skin features (e.g., skin color). Thus, the brightness of a skin image obtained in the same lighting environment differs per user. This means that the brightness of lighting or camera control parameters need to be adjusted per user skin feature (e.g., skin color) so as to obtain images with a brightness necessary for ensuring accurate skin analysis.

The above information is presented as background information only to assist with an understanding of the disclosure. No determination has been made, and no assertion is made, as to whether any of the above might be applicable as prior art with regard to the disclosure.

SUMMARY

Provided is an electronic device that obtains images free from influence by an external light in obtaining skin images when the external light is positioned around the target person for skin measurement.

Provided is an electronic device capable of uniformly obtaining images that may ensure skin analysis accuracy.

Provided is a method of controlling an electronic device that obtains images free from influence by an external light in obtaining skin images when the external light is positioned around the target person for skin measurement.

Provided is a method of controlling an electronic device capable of uniformly obtaining images that may ensure skin analysis accuracy.

In accordance with an aspect of the disclosure, an electronic device may include: at least one camera; at least one light source; and at least one processor configured to control the at least one camera to capture a user image, identify a brightness of a facial skin image from the user image, determine at least one of a capture control parameter of the at least one camera and an output control parameter of the at least one light source, based on the identified brightness, and control the at least one camera to recapture the user image according to the at least one of the determined capture control parameter and the determined output control parameter of the light source.

In accordance with various embodiments, a method of controlling an electronic device including at least one camera and at least one light source, may include: controlling the at least one camera to capture a user image; identifying a brightness of a facial skin image from the user image; determining at least one of a capture control parameter of the at least one camera and an output control parameter of the at least one light source, based on the identified brightness; and controlling the at least one camera to recapture the user image according to the at least one of the determined capture control parameter and the determined output control parameter.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
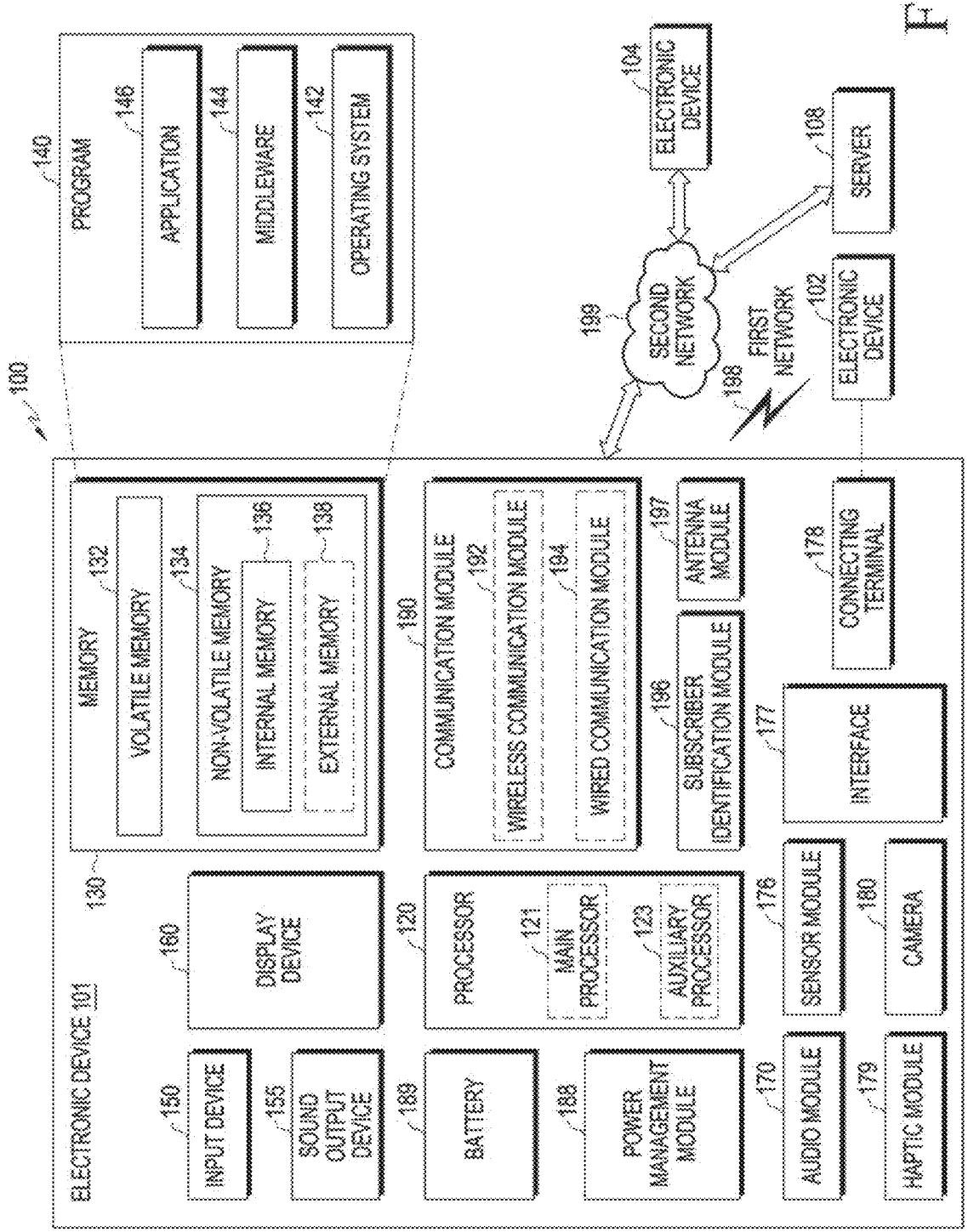
FIG. 1A is a block diagram illustrating an electronic device in a network environment according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

FIG. 1A is a block diagram illustrating an electronic device 101 in a network environment 100 according to various embodiments.

Referring to FIG. 1A, the electronic device 101 in the network environment 100 may communicate with an electronic device 102 via a first network 198 (e.g., a short-range wireless communication network), or an electronic device 104 or a server 108 (e.g., a cloud server 800 of FIG. 8) via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera 180, a power management module 188, a battery 189, a communication module 190, a subscriber identification module (SIM) 196, or an antenna module 197. In some embodiments, at least one (e.g., the display device 160) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside of the electronic device 101, for example, from a user. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside of the electronic device 101, for example, to the user. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102, such as a speaker or a headphone, that is directly or wirelessly connected with the electronic device 101).

The light source 171 may include at least one light emitting diode (LED). According to an embodiment, the light source may mean a single LED or a circuit including an array of a plurality of LEDs.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The electronic device 101 may further include a connecting terminal 178. The connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors (e.g., charge-coupled devices (CCDs) or complementary metal-oxide-semiconductors (CMOSs)), image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell. According to an embodiment, the battery 189 may be connected to a wall power outlet to receive power from an external power source.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) and/or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, or a computer network (e.g., wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 is instructed to perform a function or a service automatically, or in response to a request from a user or another device, the electronic device

101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
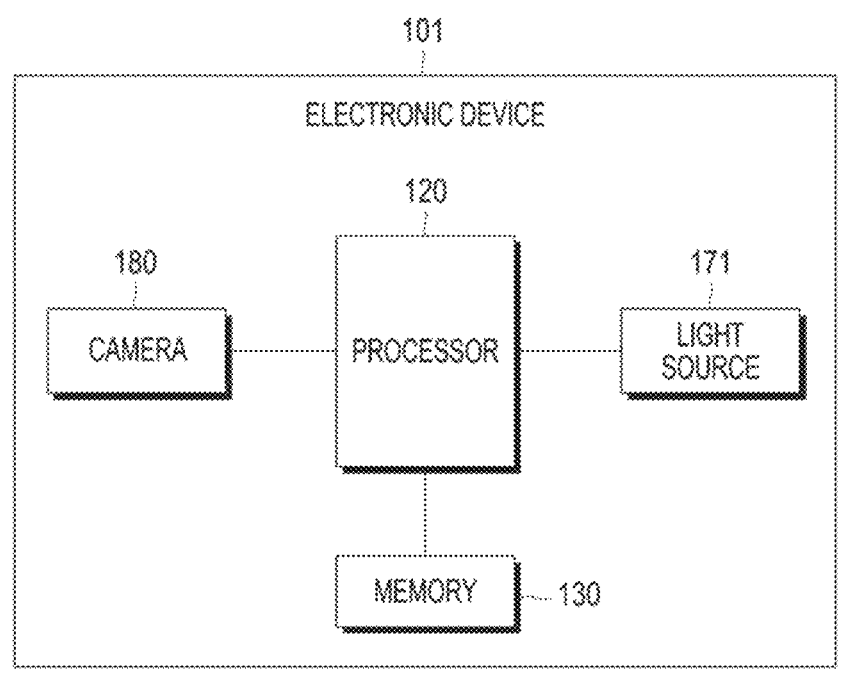
FIGS. 1B and 1C are views illustrating an electronic device according to an embodiment.
Figure 1C:
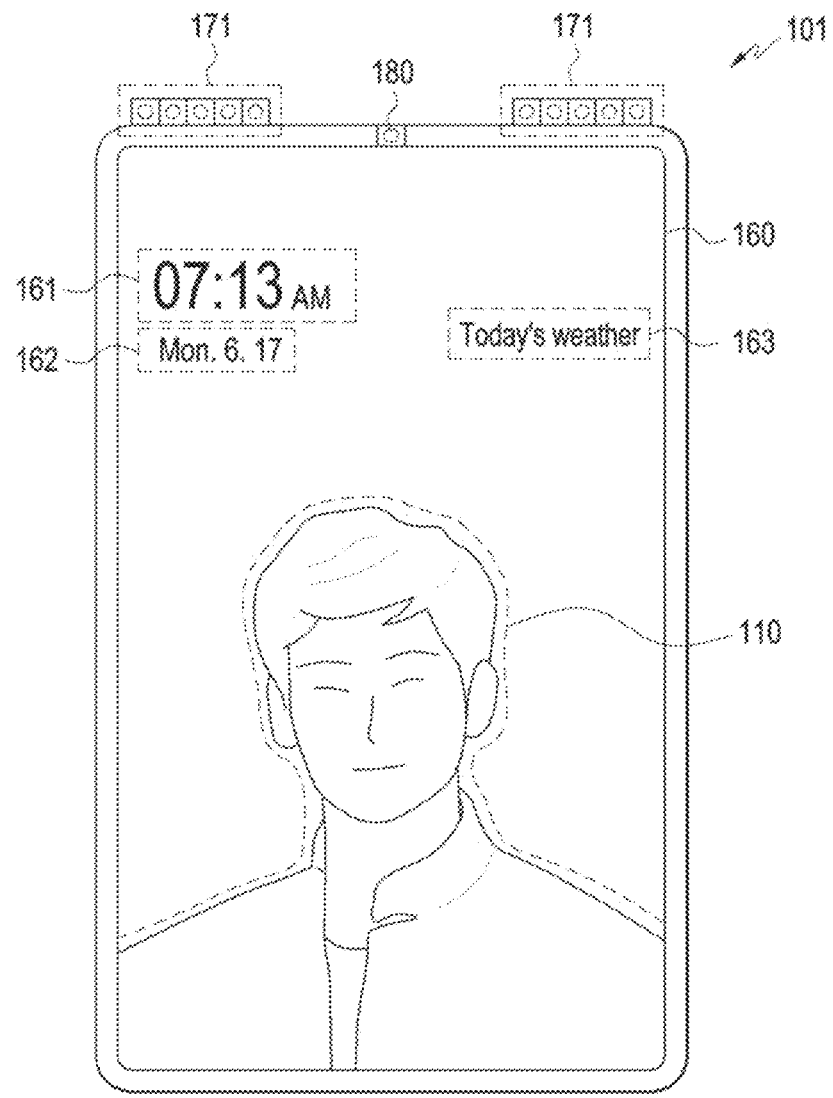

FIGS. 1B and 1C are views illustrating an electronic device 101 according to an embodiment.

Referring to FIG. 1B, according to an embodiment, an electronic device 101 may include a processor 120, a memory 130, a camera 180, and a light source 171. The light source 171 may be a camera flash that produces a flash of artificial light to illuminate a scene to be captured by the camera 180

According to an embodiment, the processor 120 may transmit a capture control signal to the camera 180 to allow the camera 180 to obtain information for a user's image (simply, a user image). For example, according to an embodiment, the processor 120 may perform processing or computation on the pixel values (e.g., red-green-blue (RGB) values), as data, of the user image obtained from the image sensor of the camera 180. According to an embodiment, the processor 120 may identify the brightness of the facial skin image from the obtained user image. According to an embodiment, the function or operation of identifying the brightness of the facial skin image by the processor 120 is described below in detail with reference to FIG. 2A. According to an embodiment, the processor 120 may determine at least one control parameter of the capture control parameter of the camera 180 or the output control parameter of the light source 171 based on the identified brightness of the facial skin image and may transmit a control signal according to the determined parameter to the camera 180 and/or the light source 171. According to an embodiment, the processor 120 may transmit a control signal for re-obtaining (e.g., capturing) the user image according to the capture control parameter of the camera 180 or the output control parameter of the light source 171, which is determined by the identified brightness of the facial skin image, to the camera 180.

According to an embodiment, the memory 130 may store a mapping table related to the capture control parameter of the camera 180 or the output control parameter of the light source 171 according to the identified brightness of the facial skin image of the user as shown in Tables 1 to 3. According to an embodiment, upon identifying the brightness of the facial skin image, the processor 120 may compare the identified brightness of the facial skin image with a target brightness (e.g., a predetermined brightness of an image required to improve skin analysis accuracy) and access the memory 130 to read the capture control parameter of the camera 180 and/or the output control parameter of the light source 171 for obtaining the user image with the target brightness so as to adjust the capture control parameter and/or the output control parameter according to a result of the comparison. According to an embodiment, "target brightness" is also mentioned in the description of FIG. 2C. According to an embodiment, the memory 130 may store an equation for computing the capture control parameter of the camera 180 or the output control parameter of the light source 171 according to the identified brightness of the facial skin image of the user as shown in Equations 3 to 5. According to an embodiment, the processor 120, upon identifying the brightness of the facial skin image, may compare the identified brightness of the facial skin image with the target brightness. According to an embodiment, the processor 120 may compute the capture control parameter of the camera 180 or the output control parameter of the light source 171 according to the equation based on the result of comparison. According to an embodiment, the processor 120 may control the camera 180 and/or the light source 171 with the control parameter obtained according to the computation.

According to an embodiment, the camera 180 may obtain the user image according to a capture control signal generated according to a user input or may obtain the user image according to a capture control signal generated according to a time (e.g., timer) set by the processor 120. According to an embodiment, the camera 180 (including, e.g., an image sensor) may generate a pixel value (e.g., an RGB value) indicating the user image and transmit the generated pixel value to the processor 120 or memory 130 directly or via the processor 120. According to an embodiment, the camera 180 may receive a control signal for varying the capture control parameter from the processor 120. According to an embodiment, the camera 180 may vary the capture control parameter (e.g., exposure time) of the camera 180 according to the control signal obtained from the processor 120, thereby obtaining or re-obtaining the user image.

According to an embodiment, the light source 171 may receive a control signal for varying the output control parameter from the processor 120. According to an embodiment, the light source 171 may vary the output control parameter (e.g., the magnitude of current input to the light source 171 or the strength of light output from the light source 171) of the light source 171 according to the control signal obtained from the processor 120 and output light.

Referring to FIG. 1C, according to an embodiment, the electronic device 101 may include a display device 160 for displaying the user image 110. According to an embodiment, the electronic device 101 may obtain the user image 110 using the camera 180. According to an embodiment, "user image 110" may mean an image of a user including the user's facial area. When the camera 180 captures a scene including the user and obtains an image including the scene, the processor 120 may perform image recognition on the image to extract the user image 110 from the entire scene.

According to an embodiment, the display device 160 of the electronic device 101 may display time information 161, date information 162, and weather information 163. According to an embodiment, a single light source 171 may be disposed on the top, bottom, or side of the electronic device 101, or two light sources 171 may be symmetrically or asymmetrically disposed on the top, bottom, or side of the electronic device 101.

Figure 2A:
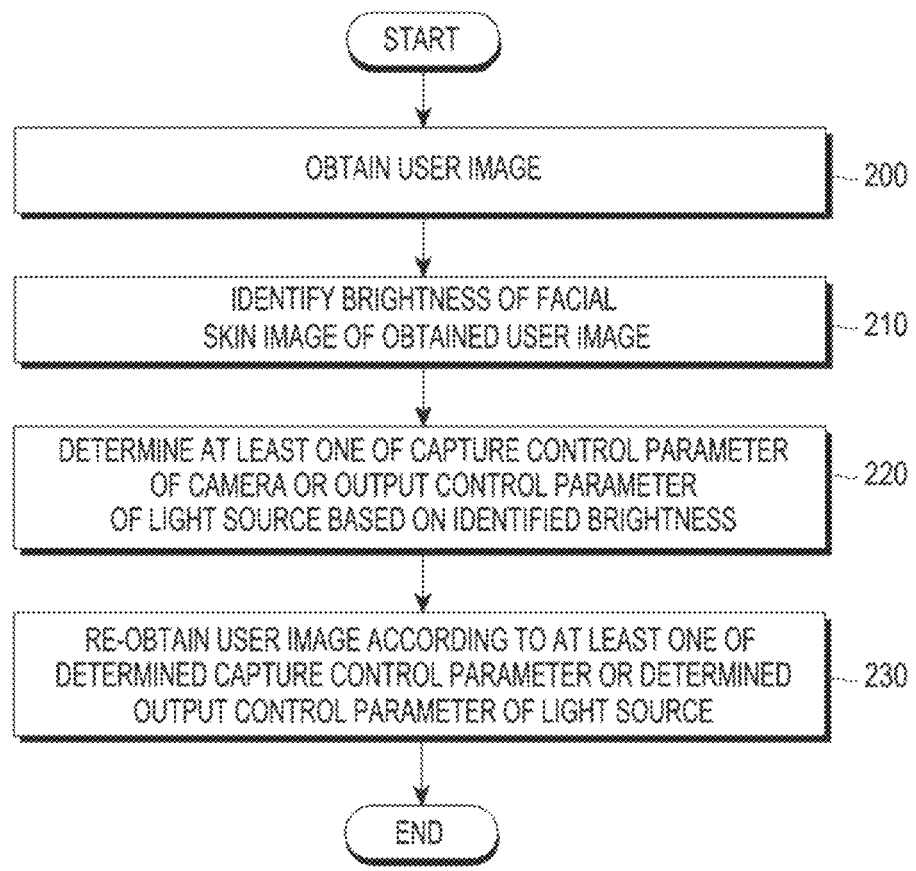
FIG. 2A is a view illustrating an example method of operating an electronic device according to an embodiment.

FIG. 2A is a view illustrating an example method of operating an electronic device according to an embodiment.

Referring to FIG. 2A, according to an embodiment, an electronic device (e.g., the electronic device 101 of FIG. 1) may obtain a user image (e.g., 110 of FIG. 1C) in operation 200. According to an embodiment, the electronic device 101 may control the quantity of light from the light source 171 while obtaining a plurality of user images 110 by capturing via the camera 180 depending on different quantities of light in operation 200. For example, according to an embodiment, the electronic device 101 may obtain a user image by capturing in an off state of the light source 171 and a user image by capturing in an on state of the light source 171.

Relevant operations thereto are described below in detail with reference to FIG. 3C. According to an embodiment, the processor 120 may transmit a capture control signal to the camera 180 to allow the camera 180 to obtain information for a user's image (simply, a user image). For example, according to an embodiment, the processor 120 may perform processing or computation on the pixel values (e.g., red-green-blue (RGB) values), as data, of the user image obtained from the image sensor of the camera 180. According to an embodiment, the processor 120 may generate a control signal for controlling the quantity of light from the light source 171 while obtaining a plurality of user images 110 by capturing via the camera 180 depending on different quantities of light. For example, according to an embodiment, the processor 120 may generate a control signal for obtaining a user image by capturing in an off state of the light source 171 and a user image by capturing in an on state of the light source 171.

According to an embodiment, in operation 210, the electronic device (e.g., the electronic device 101 of FIG. 1) may identify the brightness of the facial skin image from the user image obtained in operation 210. According to an embodiment, the "brightness of the facial skin image" may mean the brightness of the facial skin area in the image illuminated by light (e.g., light output from the light source 171 and/or external light). The "brightness of the facial skin image" may also mean the quantity of light sensed by the image sensor of the camera 180, or an attribute of visual perception elicited by the luminance of the facial skin.

According to an embodiment, in operation 210, the electronic device 101 may identify the brightness of the facial skin image illuminated by specific light by comparing the facial skin image obtained in the off state of the light source 171 and the facial skin image in the on state of the light source 171. For example, according to an embodiment, if the brightness of the facial skin image obtained in the off state of the light source 171 is 20, and the brightness of the facial skin image in the on state of the light source 171 is 100, the electronic device 101 may determine that the brightness of the facial skin image for the quantity of light output from the light source 171 is 80 which is less than 100 by 20 (i.e., 80=100-20). For example, the "brightness of the facial skin image is 80" may mean a value resulting from applying the degree of the user facial skin's reaction (e.g., reflection and absorption) to the quantity of light output from the light source 171 and, thus, may be regarded as the brightness of the facial skin image that may be obtained depending on the user skin feature in the quantity of light output from the light source 171. According to an embodiment, the electronic device 101 may obtain information about the quantity of light currently output from the light source 171 to adjust the quantity of light output. According to an embodiment, the electronic device 101 may set a specific quantity of light and output the quantity of light of the light source 171, and the electronic device 101 may identify the brightness of the facial skin image of the user according to the specific quantity of light as set via the above process (e.g., computation of a difference between the facial skin images obtained in the on and off states of the light source 171). In the disclosure, the brightness of the facial skin image to which the degree of the user facial skin's reaction by the quantity of light output from the light source 171 according to the quantity of light set by the electronic device 101 has been applied is defined as an "identified brightness" or an "identified brightness of the facial skin image," and the process of obtaining the same is represented as "identifying the brightness of the facial skin image."

According to an embodiment, the electronic device 101 may determine the brightness of the facial skin image according to Equation 1 or 2 below. In other words, for example, the electronic device 101 may determine (e.g., compute) the brightness of the facial skin image in such a manner as to add the light quantities recorded in the red, green, and blue channels of the image sensor included in the camera 180 of FIG. 1. According to an embodiment, the term "intensity" may be used instead of the term "brightness," and it is well known that the terms "intensity" and "brightness" may be interchangeably used in the image processing field of art.

$$\text{Unweighted intensity} = (\text{Red} + \text{Green} + \text{Blue})/3 \quad \text{[Equation 1]}$$

$$\text{Weighted intensity} = 0.2989 \times \text{Red} + 0.5870 \times \text{Green} + 0.1140 \times \text{Blue} \quad \text{[Equation 2]}$$

According to an embodiment, various techniques may be used to determine the brightness of the facial skin image. For example, the image sensor of the camera 180 may be configured in the form of RGBW so that the quantity of light recorded by the W channel (e.g., sensing the quantity of light by the white channel without any color filter), as well as quantities of light recorded by the RGB channels (e.g., sensing the quantity of light corresponding to each color of red, green, and blue via color filters) is used as the brightness of image. Or, such an equation as to correct the values obtained from the RGB channels may be used. Also available is that the processor 120 converts the quantity of light sensed by the image sensor with various color models to thereby determine the brightness (such color models as, e.g., YCbCr, HSI, HSL, or HSV). According to an embodiment, the processor 120 may identify the brightness of a facial skin image by computation according to Equation 1 or 2 from the user image obtained by the camera 180 and stored in the memory 130.

Figure 2B:
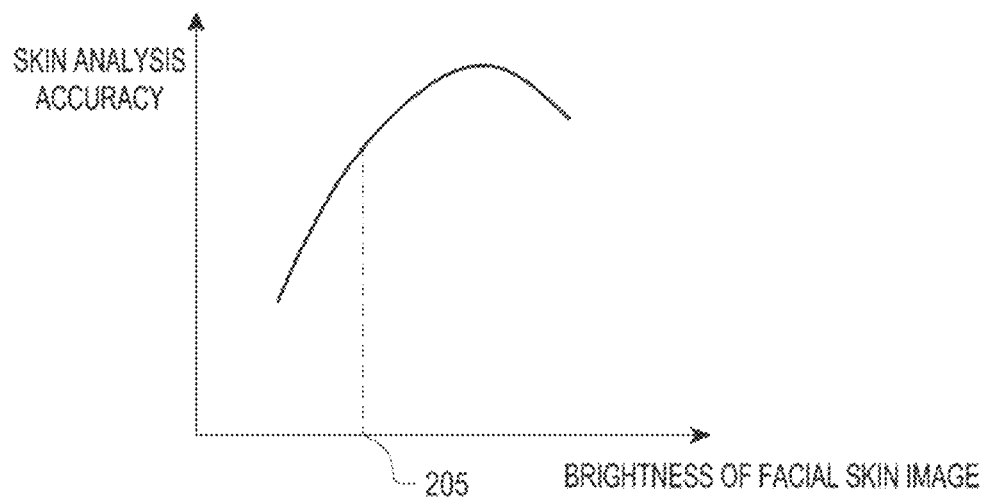
FIGS. 2B and 2C are views illustrating an example relationship between skin analysis accuracy and facial skin image brightness according to an embodiment.
Figure 2C:
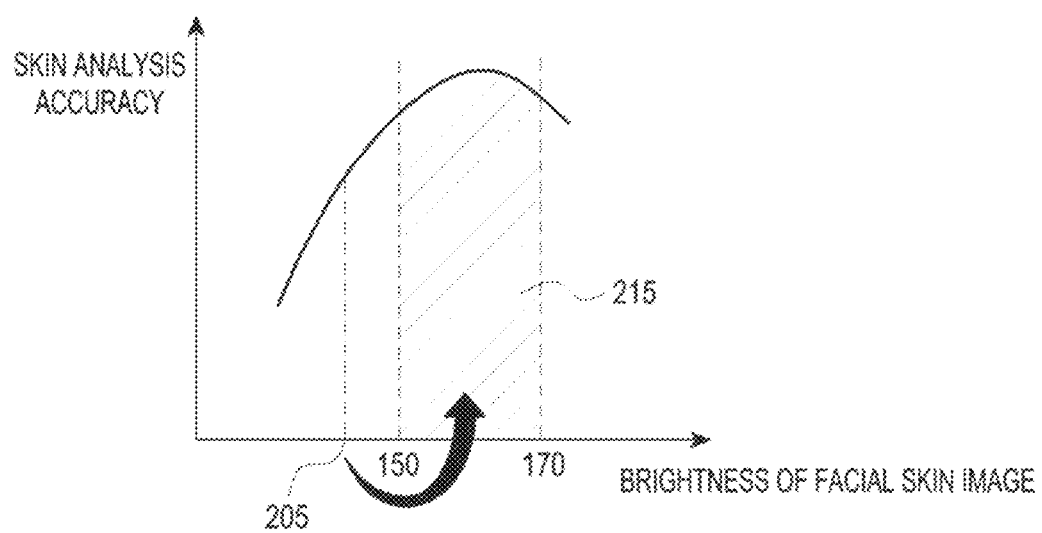

According to an embodiment, the electronic device 101 may, in operation 220, determine at least one control parameter of the capture control parameter of the camera 180 or the output control parameter of the light source 171 based on the brightness identified in operation 210. FIG. 2B is a view illustrating an example relationship between skin analysis accuracy and facial skin image brightness according to an embodiment. Accurate analysis of the skin condition requires skin images captured at a proper amount of light (e.g., an amount of light greater than a predetermined amount light). For example, if light is too bright or dark when capturing occurs, the quantity of light the image sensor may detect may be insufficient or saturated (e.g., the quantity of light sensed by the image sensor exceeds the limit for digital representation so that it is represented only with the maximum value) and, thus, the captured skin image does not contain sufficient information necessary for skin analysis or the image pixel values are constituted only of the maximum value, it may be difficult to accurately analyze the user's skin condition. This causes variations in skin analysis accuracy depending on the brightness of the facial skin image as shown in FIG. 2B. To obtain the data for the relationship between skin analysis accuracy and brightness of the facial skin image as shown in FIG. 2B, facial skin images with various brightness levels may be obtained for the testee while the output quantity of light of the light source 171 or a lighting device with the same performance as the light source 171 is adjusted in the environment where the light source 171 of the electronic device 101 or the lighting device with the same performance as the light source 171 is on with no external light provided, as in a darkroom, the obtained facial skin images may be analyzed, and the accuracy of the result of analysis may be matched to each brightness of facial skin image. FIG. 2C illustrates that it is possible to designate a skin image brightness range 215 that ensures a high skin analysis accuracy via the so-obtained data for the relationship (e.g., FIG. 2B) between the facial skin image brightness and skin analysis accuracy, showing how much the brightness of the facial skin image needs to be adjusted to obtain a facial skin image for ensuring a high accuracy when the facial skin brightness 205 identified in operation 210 is out of the facial skin image brightness range 215 ensuring a high accuracy. For example, if the skin image brightness range 215 for ensuring a high accuracy is designated to be from 150 to 170, and the facial skin brightness 205 identified in operation 210 is 140, it may be determined that as bright a facial skin image as a minimum of 10 to a maximum of 30 is needed to obtain the facial skin image included in the brightness range 215, and the electronic device 101 (e.g., the processor 120 of FIG. 1A) may determine the capture control parameter or the output control parameter of the light source 171 for obtaining the facial skin image as bright as the difference.

According to an embodiment, the electronic device 101 may determine the capture control parameter based on the mapping table as shown in Table 1 below. For example, according to an embodiment, the electronic device 101 may set an initial capture control parameter (e.g., an exposure time of 1/56 seconds) in operation 200, and if the brightness of the facial skin image is identified to be 80 in operation 210, the electronic device 101 may determine that the exposure time is one (e.g., 1/28 seconds) by which the identified brightness (e.g., 80) of the facial skin image may be substantially doubled so as to obtain a facial skin image with a target brightness (e.g., 160). In other words, twice as bright as the identified brightness (e.g., 80) of the facial skin image needs to be obtained to obtain the facial skin image with the target brightness (e.g., 160). Thus, according to an embodiment, the electronic device 101 may substantially double the exposure time and then obtain an image so as to obtain the two times brighter image. According to an embodiment, "target brightness" may be an image brightness required to improve the accuracy of skin analysis on the user and this may be a predesignated value. According to an embodiment, each item in the mapping table, e.g., Table 1, may be determined to be a single value or a range with the maximum and minimum values. For example, the "identified brightness of facial skin image" item in Table 1 may be represented as a range, e.g., from 30 to 39 or from 40 to 49. According to an embodiment, the "target brightness" in the "exposure time for obtaining target brightness" item may also be determined to be a range, e.g., from 150 to 170. According to an embodiment, the "exposure time" in the "exposure time for obtaining target brightness" item may mean an exposure time for obtaining an image with a brightness in the "target brightness" range (e.g., from 150 to 170).

According to an embodiment, the capture control parameter (e.g., exposure time) may be determined by Equation 3, rather than the mapping table, e.g., Table 1.

$$Y=(A/B)*X \quad \text{[Equation 3]}$$

In Equation 3, variable Y may mean the exposure time to be used for reaching the target brightness, and variable Y may mean the exposure time used in the capturing of operation 200. In Equation 3, variable A may mean the target brightness (e.g., 160), and variable B may mean the brightness of the facial skin image identified in operation 210.

According to an embodiment, the target brightness may be a value exceeding 150 and less than 170 as shown in FIG. 2C. Although only the exposure time in Table 1 is varied in the following description, this is merely an example. For example, at least one of the exposure time (adjusted by, e.g., shutter speed), the sensitivity (e.g., International Organization for Standardization (ISO) value that refers to the light sensitivity of the image sensor) or F number of the image sensor of the camera 180 may be varied. Here, the F number may mean the value resulting from dividing the focal length of the camera 180 by the diameter of the entrance pupil.

TABLE 1

| Exposure time (seconds) set in operation 200 | identified facial skin brightness of image | ISO | exposure time (seconds) for obtaining target brightness (e.g., 160) |
|---|---|---|---|
| 1/56 | 30 | 125 | 1/10 |
| 1/56 | 40 | 125 | 1/14 |
| 1/56 | 50 | 125 | 1/18 |
| 1/56 | 60 | 125 | 1/21 |
| 1/56 | 70 | 125 | 1/24 |
| 1/56 | 80 | 125 | 1/28 |
| ... | ... | ... | ... |
| 1/56 | 140 | 125 | 1/50 |

According to an embodiment, the electronic device 101 may determine the output control parameter of the light source 171 based on the mapping table as shown in Table 2 below. For example, according to an embodiment, if the brightness of the facial skin image is identified to be 80, the electronic device 101 may determine that the quantity of light is 533 lux which is substantially twice as high as the quantity of light (e.g., 267 lux) corresponding to the identified brightness (e.g., 80) of a facial skin image so as to obtain a facial skin image with the target brightness (e.g., 160). For example, twice as bright as the identified brightness (e.g., 80) of the facial skin image needs to be obtained to obtain the facial skin image with the target brightness (e.g., 160). Thus, according to an embodiment, the electronic device 101 may substantially double the quantity of light and then obtain an image so as to obtain the two times brighter image.

TABLE 2

| set in operation 200 quantity of light (lux) | identified facial skin brightness of image | quantity of light (lux) for obtaining target brightness (e.g., 160) |
|---|---|---|
| 100 | 30 | 533 |
| 100 | 40 | 400 |
| 100 | 50 | 320 |
| 100 | 60 | 267 |
| 100 | 70 | 229 |
| 100 | 80 | 200 |
| 100 | 90 | 178 |
| ... | ... | ... |
| 100 | 150 | 107 |

According to an embodiment, the output control parameter (e.g., quantity of light) may be determined by Equation 4, rather than the mapping table, e.g., Table 2.

$$W=(A/B)*Z \quad \text{[Equation 4]}$$

In Equation 4, variable W may mean the quantity of light to be used for reaching the target brightness, and variable Z may mean the quantity of light used in the capturing of operation 200. In Equation 4, variable A may mean the target brightness (e.g., 160), and variable B may mean the brightness of the facial skin image identified in operation 210.

According to an embodiment, the electronic device 101 may determine both the output control parameter of the light source 171 and the capture control parameter based on the mapping table as shown in Table 3 below so as to obtain an image with a target brightness. For example, if the identified brightness of the facial skin image is determined to be 40, the exposure time of the camera 180 may be determined to be 1/28 seconds, and the quantity of light of the light source 171 may be determined to be 200 lux so as to obtain an image with the target brightness (e.g., 160). For example, four times as bright as the identified brightness (e.g., 40) of the facial skin image needs to be obtained to obtain the facial skin image with the target brightness (e.g., 160). Thus, according to an embodiment, the electronic device 101 may substantially double each of the quantity of light and exposure time and then obtain an image so as to obtain the four times brighter image.

TABLE 3

| set in operation 200 exposure time (seconds) | set in operation 200 quantity of light (lux) | identified brightness of facial skin image | for obtaining target brightness (e.g., 160) quantity of light (lux) | for obtaining target brightness (e.g., 160) exposure time (seconds) |
| --- | --- | --- | --- | --- |
| 1/56 | 100 | 40 | 200 | 1/28 |
| 1/56 | 100 | ... | ... | ... |
| 1/56 | 100 | 80 | 141 | 1/40 |
| 1/56 | 100 | ... | ... | ... |
| 1/56 | 100 | 120 | 115 | 1/49 |
| 1/56 | 100 | ... | ... | ... |
| 1/56 | 100 | 160 | 103 | 1/54 |

According to an embodiment, the output control parameter (e.g., quantity of light) and the capture control parameter (e.g., exposure time) may be determined by Equation 5, rather than the mapping table, e.g., Table 3.

$$(1) Y = \mathrm{sqrt}(A/B) * X, \text{ and}$$

$$(2) W = \mathrm{sqrt}(A/B) * Z \quad \text{[Equation 5]}$$

In (1) of Equation 5, variable Y may mean the exposure time to be used for reaching the target brightness, and variable Y may mean the exposure time used in the capturing of operation 200. In (1) of Equation 5, variable A may mean the target brightness (e.g., 160), and variable B may mean the brightness of the facial skin image identified in operation 210. In (2) of Equation 5, variable W may mean the quantity of light to be used for reaching the target brightness, and variable Z may mean the quantity of light used in the capturing of operation 200. In (2) of Equation 5, variable A may mean the target brightness (e.g., 160), and variable B may mean the brightness of the facial skin image identified in operation 210. In (1) and (2) of Equation 5, "sqrt( )" may mean square root operation. According to an embodiment, the processor 120 may determine at least one control parameter of the capture control parameter of the camera 180 or the output control parameter of the light source 171 based on the identified brightness of the facial skin image and may transmit a control signal according to the determined parameter to the camera 180 and/or the light source 171. According to an embodiment, the processor 120 may transmit a control signal for re-obtaining (e.g., capturing) the user image according to the capture control parameter of the camera 180 or the output control parameter of the light source 171, which is determined by the identified brightness of the facial skin image, to the camera 180.

According to an embodiment, the memory 130 may store a mapping table related to the capture control parameter of the camera 180 or the output control parameter of the light source 171 according to the identified brightness of the facial skin image of the user as shown in Tables 1 to 3. According to an embodiment, upon identifying the brightness of the facial skin image, the processor 120 may compare the identified brightness of the facial skin image with a target brightness (the brightness of an image required to improve skin analysis accuracy) and access the memory 130 to read the capture control parameter of the camera 180 and/or the output control parameter of the light source 171 for obtaining the user image with the target brightness so as to adjust the capture control parameter and/or the output control parameter according to a result of the comparison. According to an embodiment, "target brightness" is also mentioned in the description of FIG. 2C. According to an embodiment, the memory 130 may store an equation for computing the capture control parameter of the camera 180 or the output control parameter of the light source 171 according to the identified brightness of the facial skin image of the user as shown in Equations 3 to 5. According to an embodiment, the processor 120, upon identifying the brightness of the facial skin image, may compare the identified brightness of the facial skin image with the target brightness. According to an embodiment, the processor 120 may compute the capture control parameter of the camera 180 or the output control parameter of the light source 171 according to the equation based on the result of comparison. According to an embodiment, the processor 120 may control the camera 180 and/or the light source 171 with the control parameter obtained according to the computation.

According to an embodiment, the electronic device (e.g., the electronic device 101 of FIG. 1) may, in operation 230, re-obtain a user image according to at least one of the determined capture control parameter or the determined output control parameter of the light source 171. Referring to FIGS. 2B and 2C, according to an embodiment, if light output from a controllable light (e.g., the light source 171 of the electronic device 101) is radiated to the user's face so that the user's facial skin image brightness (e.g., the brightness identified in operation 210 of FIG. 2A) is rendered to have an arbitrary value 205, a facial skin image included in the brightness range 215 may be obtained, with the capture control parameter of the camera 180 or the output control parameter of the light source 171 varied, so as to further increase skin analysis accuracy (e.g., operations 220 and 230 of FIG. 2A). The phrase "brightness of facial skin image" denoted along the horizontal axis of FIGS. 2B and 2C may mean the brightness of the user's facial skin image captured by irradiating the user's face with light output only from the light source 171 (i.e., a light controllable by the electronic device 101) of the electronic device (e.g., which corresponds to the "identified brightness of facial skin image" described in connection with FIG. 2A). This also means an image brightness that may be obtained when the user's facial skin is under a specific lighting condition and means a skin feature reacting to light. In the disclosure, the phrase "brightness range in which skin analysis accuracy may be increased" may be interchangeably used with the term "target brightness."

For example, according to an embodiment, if the identified brightness of the facial skin image is 80, the electronic device 101 may change the exposure time of the camera 180 to 1/28 seconds and re-obtain a user image so as to obtain an image with the target brightness (e.g., 160). According to an embodiment, if the identified brightness of the facial skin image is determined to be 80, the electronic device 101 may change the quantity of light of the light source 171 to 533 lux and re-obtain a user image so as to obtain an image with the target brightness (e.g., 160). According to an embodiment, the electronic device 101 may determine that the re-obtained user image is an image for skin analysis. According to an embodiment, an operation of re-obtaining a user image while controlling the camera 180 of the electronic device 101 and more embodiments related to the operations subsequent to operation 230 are described below in detail with reference to FIGS. 4A to 4C. According to an embodiment, the camera 180 may obtain the user image according to a capture control signal generated according to a user input or may obtain the user image according to a capture control signal generated according to a time (e.g., timer) set by the processor 120. According to an embodiment, the camera 180 (including, e.g., an image sensor) may generate a pixel value (e.g., an RGB value) indicating the user image and transmit the generated pixel value to the processor 120 or memory 130 directly or via the processor 120. According to an embodiment, the camera 180 may receive a control signal for varying the capture control parameter from the processor 120. According to an embodiment, the camera 180 may vary the capture control parameter (e.g., exposure time) of the camera 180 according to the control signal obtained from the processor 120, thereby obtaining or re-obtaining the user image.

According to an embodiment, the light source 171 may receive a control signal for varying the output control parameter from the processor 120. According to an embodiment, the light source 171 may vary the output control parameter (e.g., the magnitude of current input to the light source or the strength of light output) of the light source 171 according to the control signal obtained from the processor 120 and output light.

Figure 3A:
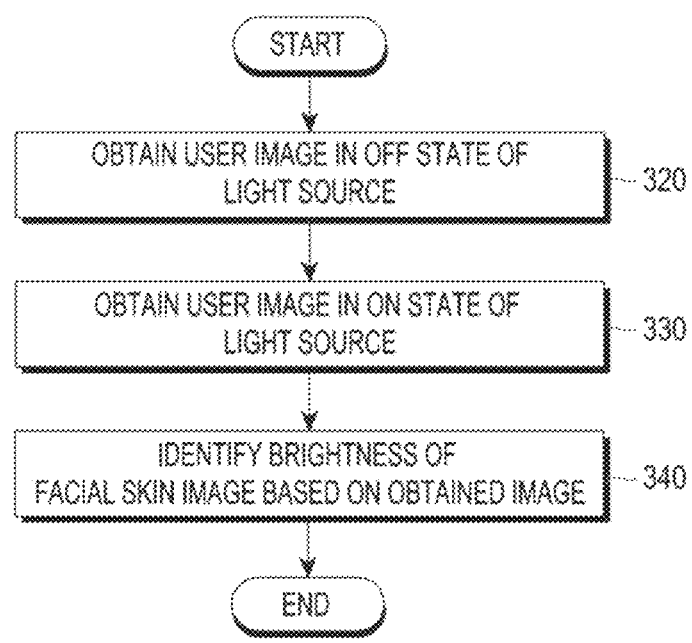
FIGS. 3A, 3B, and 3C are views illustrating an example operation of identifying the brightness of a facial skin image according to an embodiment.
Figure 3B:
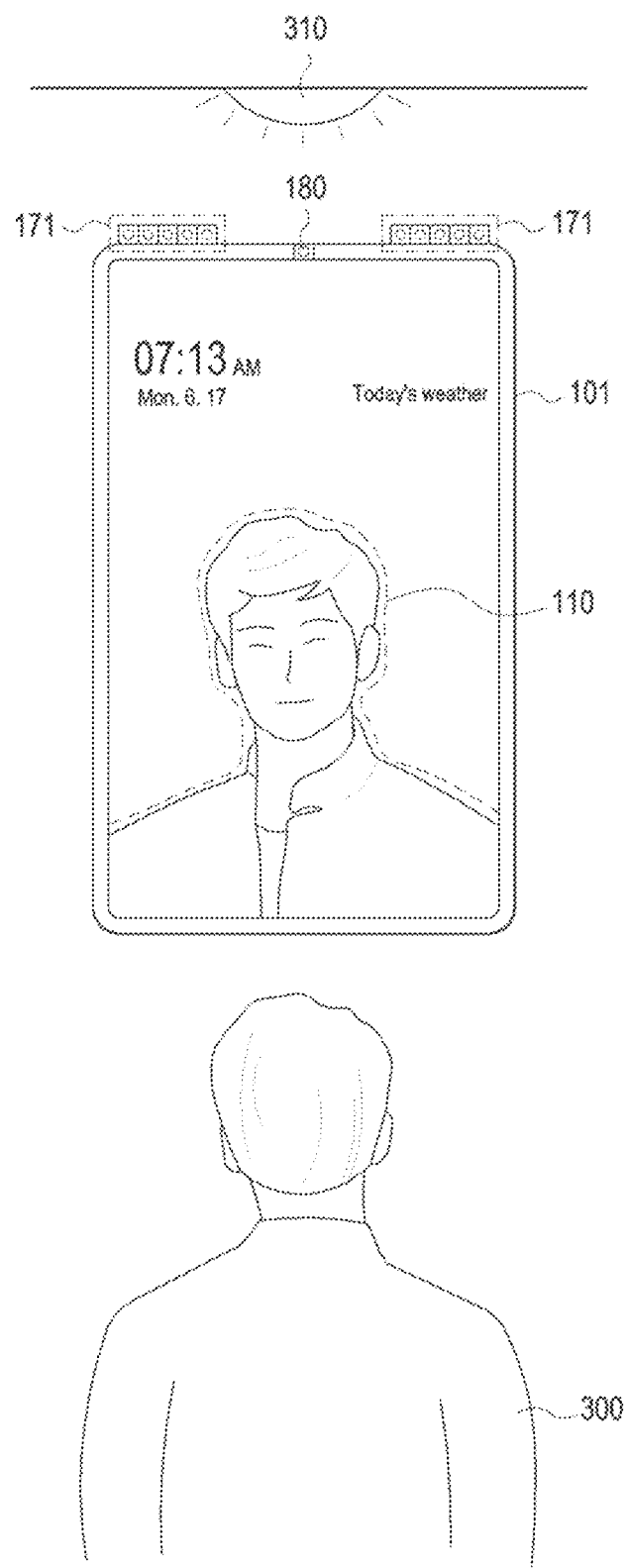
Figure 3C:
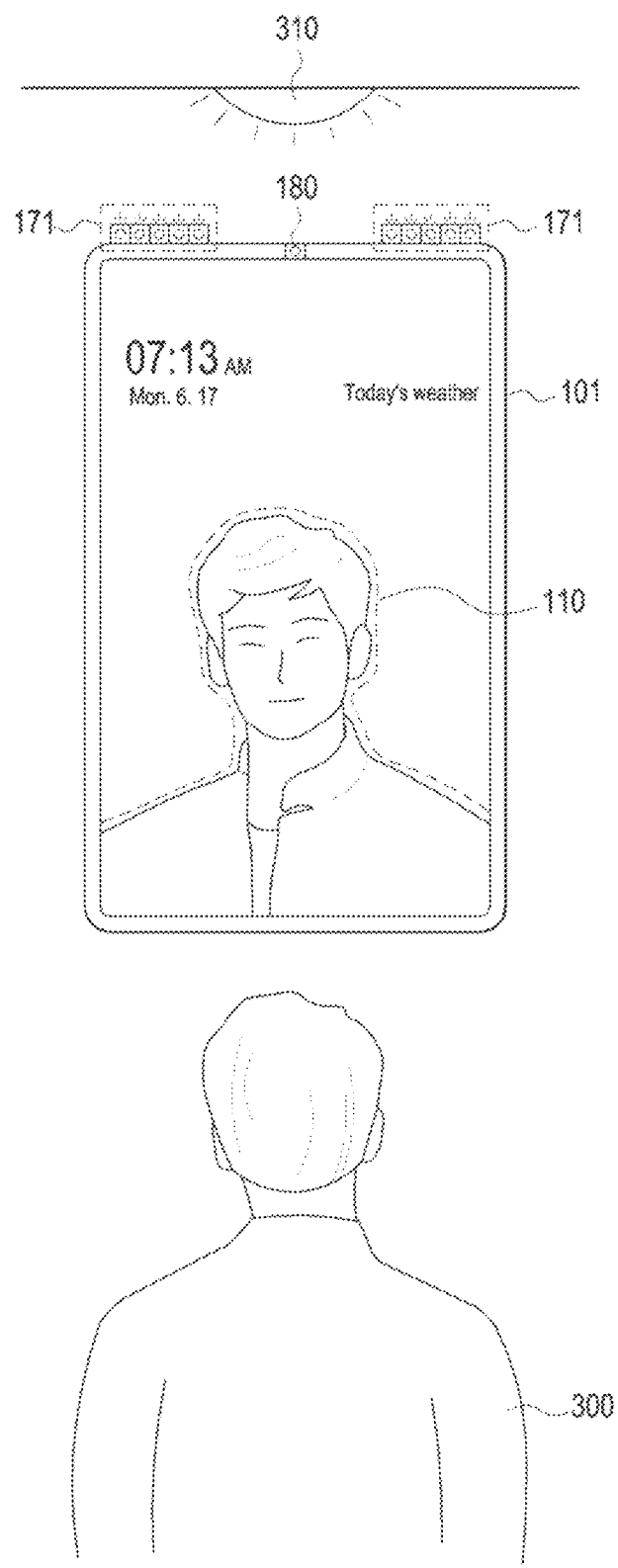

FIGS. 3A, 3B, and 3C are views illustrating an example operation of identifying the brightness of a facial skin image of a user 300 according to an embodiment.

According to an embodiment, FIG. 3A illustrates a detailed description of operations 200 and 210 of FIG. 2A. According to an embodiment, operation 200 of FIG. 2A may be described in detail in connection with operations 320 and 330 of FIG. 3A. Referring to FIG. 3A, according to an embodiment, an electronic device (e.g., the electronic device of FIG. 1A) may obtain a user image in the off state of the light source 171 in operation 320. This means obtaining a user image to which only an influence by an external light 310 has been applied. According to an embodiment, the electronic device (e.g., the electronic device of FIG. 1A) may receive a user input (e.g., a touch input or voice command) for obtaining the user image in the off state of the light source 171.

FIG. 3B illustrates an example where the light source 171 is in the off state and the external light 310 is in the on state. According to an embodiment, the electronic device 101 may determine that the brightness of the facial skin image of the user image 110 is 20.

Referring to FIG. 3B, according to an embodiment, the electronic device 101 may obtain a user image 110 using the camera 180 in the on state of the external light 310. According to an embodiment, the electronic device 101 may display the obtained user image 110 on the display device 160. According to an embodiment, although FIGS. 3B and 3C illustrate an overhead light as a representative example of the external light 310, this is merely an example for illustration purposes. According to an embodiment, the external light 310 may include all factors that may influence the brightness of image obtained via the camera 180, as indoor lighting uncontrollable by the electronic device 101 or sunshine entering the house.

FIG. 3C illustrates an example where the light source 171 and the external light 310 are in the on state.

According to an embodiment, the electronic device (e.g., the electronic device of FIG. 1A) may obtain a user image in the on state of the light source 171 in operation 330. This means obtaining a user image when the user is illuminated by both the external light 310 and the light source 171 have been applied. According to an embodiment, the electronic device (e.g., the electronic device of FIG. 1A) may receive a user input (e.g., a touch input or voice command) for obtaining the user image in the on state of the light source 171. According to an embodiment, the order of operations 320 and 330 may be changed.

Referring to FIG. 3C, according to an embodiment, the electronic device 101 may obtain a user image 110 using the camera 180 in the on state of the external light 310. According to an embodiment, the electronic device 101 may display the obtained user image 110 on the display device 160. FIG. 3C illustrates an example where the light source 171 is in the on state. According to an embodiment, the electronic device 101 may determine that the brightness of the facial skin image of the user image 110 is 100.

According to an embodiment, the electronic device 101 may detect the facial area from the user image 110. According to an embodiment, the electronic device 101 may detect the facial area based on the features of the face. According to an embodiment, the electronic device 101 may detect the facial area 510 using various face detection algorithms, such as principal component analysis (PCA) using the eigenface, linear discriminate analysis (LDA), elastic bunch graph matching (EBGM), hidden Markov model, multilinear subspace learning and neuronal motivated dynamic link matching using tensor representation.

According to an embodiment, in operation 340, the electronic device (e.g., the electronic device of FIG. 1A) may identify the brightness of the facial skin image from the obtained image. According to an embodiment, the electronic device 101 may identify the brightness of the facial skin image by comparing the user image obtained in the off state of the light source 171 and the user image in the on state of the light source 171. For example, according to an embodiment, if the brightness of the facial skin image obtained in the off state of the light source 171 is 20, and the brightness of the facial skin image in the on state of the light source 171 is 100, the electronic device 101 may determine that the brightness of the facial skin image for the quantity of light output from the light source 171, e.g., brightness of the facial skin image freed from influence by the external light, is 80 (i.e., 100-20).

Figure 4A:
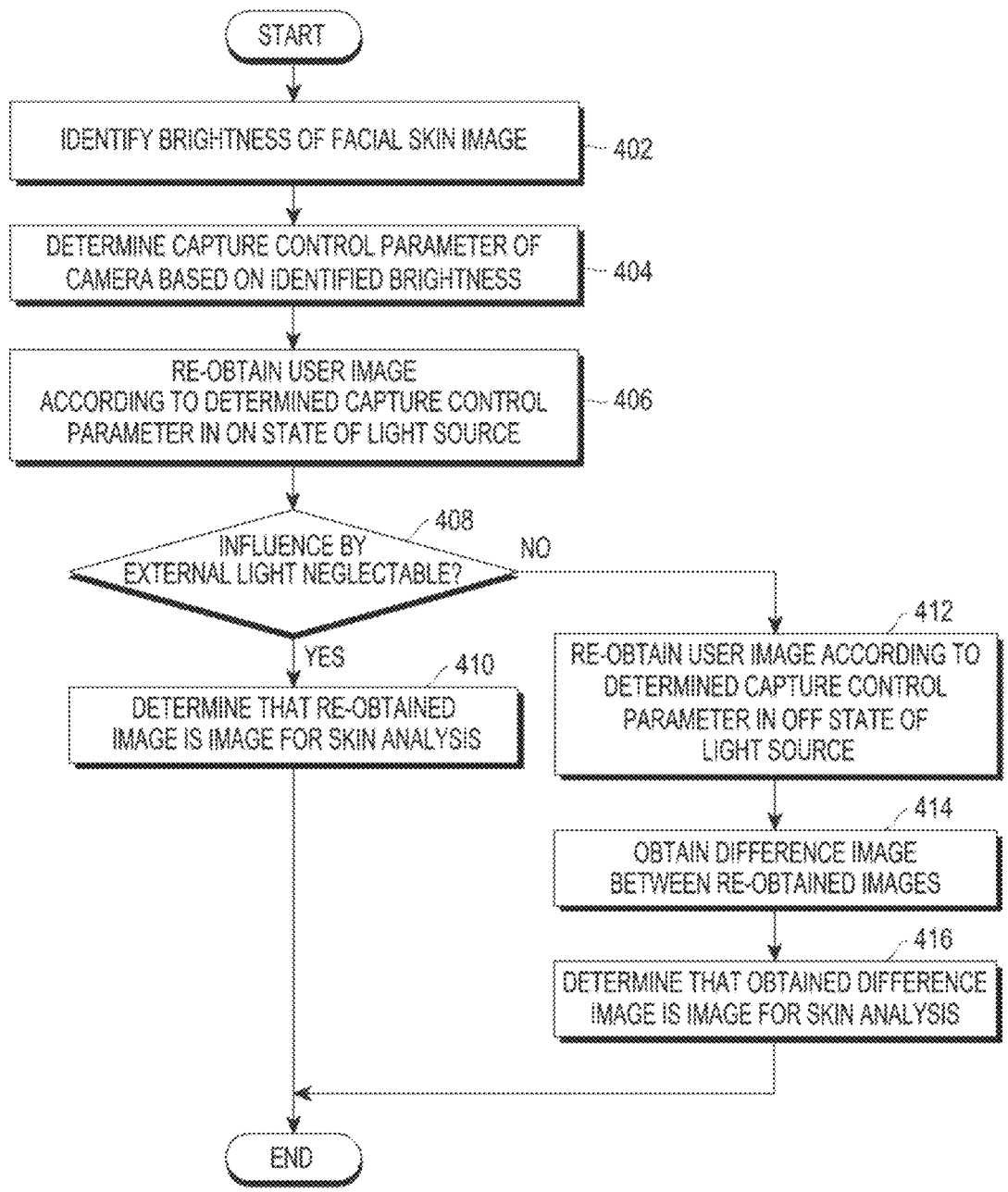
FIG. 4A is a view illustrating an example operation of re-obtaining a user image by controlling a camera according to an embodiment.

FIG. 4A illustrates an example operation of re-obtaining a user image by controlling the camera 180 according to an embodiment. FIG. 4A involves a detailed description of more embodiments related to operation 230 and the operations subsequent to operation 230.

Referring to FIG. 4A, according to an embodiment, the electronic device 101 may identify the brightness of the facial skin image based on a user image obtained by the camera (e.g., the camera 180 of FIG. 1A) in operation 402. The description of operations 200 to 210 of FIG. 2A or FIG. 3C may apply likewise to operation 402.

According to an embodiment, the electronic device (e.g., the electronic device 101 of FIG. 1A) may determine the capture control parameter of the camera 180 based on the identified brightness in operation 404. According to an embodiment, the electronic device 101 may change the capture control parameter (e.g., exposure time) from 1/80 seconds to 1/40 seconds. Determining (changing) the capture control parameter based on the identified brightness is intended for obtaining a facial skin image with a brightness for ensuring skin analysis accuracy considering the relationship between brightness of facial skin image and skin analysis accuracy (e.g., refer to FIGS. 2B and 2C).

According to an embodiment, the electronic device (e.g., the electronic device 101 of FIG. 1A) may re-obtain a user image according to the determined capture control parameter in the on state of the light source (e.g., the light source 171 of FIG. 1A) in operation 406.

According to an embodiment, the electronic device (e.g., the electronic device 101 of FIG. 1A) may, in operation 408, determine whether an influence by the external light (e.g., the external light 310 of FIG. 3B) is neglectable from the image obtained in operation 320 (which may be simply referred to herein as an "external light neglecting condition"). According to an embodiment, if the ratio of the brightness of the facial skin image in the off state of the light source 171 to the brightness of the facial skin image in the on state of the light source 171 obtained in operation 402 is less than a predesignated ratio (e.g., 5%), the electronic device 101 may determine that an influence by the external light 310 is neglectable from the image obtained in operation 320. For example, if the brightness of the facial skin image in the off state of the light source 171 is 2, and the brightness of the facial skin image in the on state of the light source 171 is 95, the ratio of the brightness of the facial skin image in the off state of the light source 171 to the brightness of the facial skin image in the on state of the light source 171 is about 2.1%, the electronic device 101 may determine that an influence by the external light 310 is neglectable from the image obtained in operation 320 according to an embodiment. If the brightness of the facial skin image in the off state of the light source 171 is 5, and the brightness of the facial skin image in the on state of the light source 171 is 95, the ratio of the brightness of the facial skin image in the off state of the light source 171 to the brightness of the facial skin image in the on state of the light source 171 is about 5.3%, the electronic device 101 may determine that an influence by the external light 310 is not neglectable from the image obtained in operation 320 according to an embodiment.

According to an embodiment, upon determining that an influence by the external light 310 is neglectable from the image obtained in operation 320 (yes in operation 408), the electronic device 101 may determine that the user image re-obtained in operation 406 is an image for skin analysis in operation 410.

According to an embodiment, upon determining that an influence by the external light 310 is not neglectable from the image obtained in operation 320 (no in operation 408), the electronic device 101 may re-obtain a user image 110 according to the determined capture control parameter (e.g., exposure time of 1/40 seconds) in the off state of the light source 171 in operation 412.

According to an embodiment, the electronic device 101 may obtain a difference image between the re-obtained images (e.g., the image re-obtained in operation 408 and the image re-obtained in operation 412) in operation 414. According to an embodiment, the electronic device 101 may obtain the difference image by computing a difference between the respective corresponding pixels of the images obtained at different times. For example, according to an embodiment, the processor 120 may compute a difference between the mean pixel value of each of specific regions in the frame obtained at a first time and the mean pixel value of each of specific regions in the frame obtained at a second time, thereby obtaining the difference image.

According to an embodiment, various techniques for obtaining the difference image may be applicable to operation 414. According to an embodiment, an image freed from an influence by the external light 310 may be obtained by obtaining the difference image. According to an embodiment, the accuracy of skin analysis may be increased by obtaining the image freed from an influence by the external light 310.

According to an embodiment, the electronic device 101 may determine that the difference image obtained in operation 414 is a final image for skin analysis in operation 416. According to an embodiment, the time at which operation 408 is performed may be varied. For example, operation 408 may be performed simultaneously with operation 402 or be performed between operation 404 and operation 406.

Figure 4B:
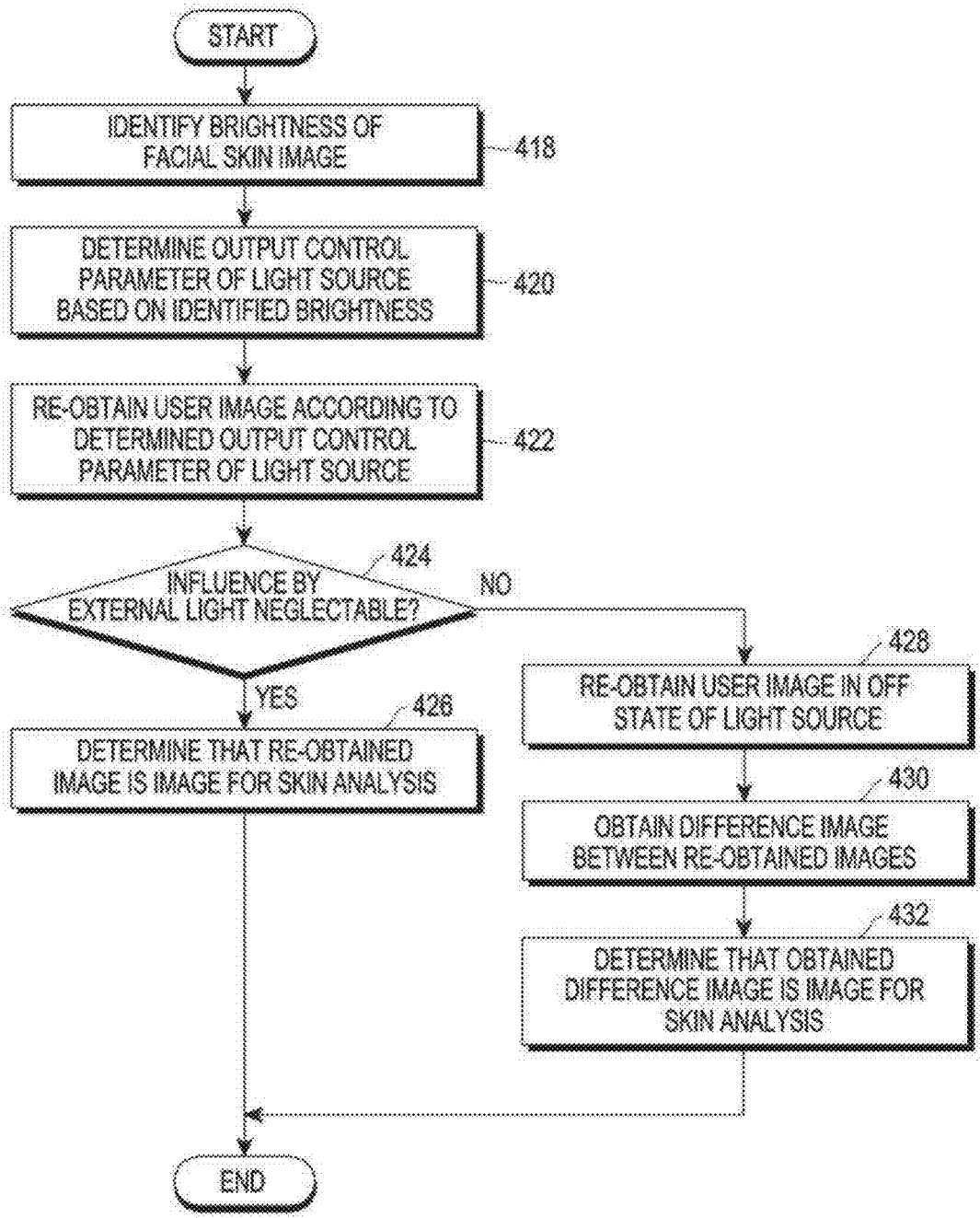
FIG. 4B is a view illustrating an example operation of re-obtaining a user image by controlling a light source according to an embodiment.

FIG. 4B is a view illustrating an example operation of re-obtaining a user image by controlling a light source 171 according to an embodiment.

Referring to FIG. 4B, according to an embodiment, the electronic device 101 may identify the brightness of the facial skin image based on a user image obtained by the camera (e.g., the camera 180 of FIG. 1A) in operation 418. The description made above in connection with FIG. 3C may apply likewise to operation 418.

According to an embodiment, the electronic device 101 may determine the output control parameter of the light source 171 based on the identified brightness in operation 420. According to an embodiment, the electronic device 101 may change the output control parameter (e.g., quantity of light) of the light source 171 from 350 lux to 530 lux.

According to an embodiment, the electronic device (e.g., the electronic device 101 of FIG. 1A) may re-obtain a user image according to the determined output control parameter (e.g., 530 lux) of the light source 171 in operation 422.

According to an embodiment, the electronic device (e.g., the electronic device 101 of FIG. 1A) may, in operation 424, determine whether an influence by the external light (e.g., the external light 310 of FIG. 3B) is neglectable from the image obtained in operation 320. The description of operation 408 may apply likewise to operation 424.

According to an embodiment, upon determining that an influence by the external light 310 is neglectable from the image obtained in operation 320 (yes in operation 424), the electronic device 101 may determine that the image re-obtained in operation 422 is a final image for skin analysis in operation 426.

According to an embodiment, upon determining that an influence by the external light 310 is not neglectable from the image obtained in operation 320 (no in operation 424), the electronic device 101 may re-obtain a user image 110 in the off state of the light source 171 in operation 428.

According to an embodiment, the electronic device 101 may obtain a difference image between the re-obtained images (e.g., the image re-obtained in operation 422 and the image re-obtained in operation 428) in operation 430. According to an embodiment, the electronic device 101 may obtain the difference image by computing a difference between the respective corresponding pixels of the images. According to an embodiment, various techniques for obtaining the difference image may be applicable to operation 428. According to an embodiment, an image freed from an influence by the external light 310 may be obtained by obtaining the difference image. According to an embodiment, the accuracy of skin analysis may be increased by obtaining the image freed from an influence by the external light 310.

According to an embodiment, the electronic device 101 may determine that the difference image obtained in operation 430 is a final image for skin analysis in operation 432.

Figure 4C:
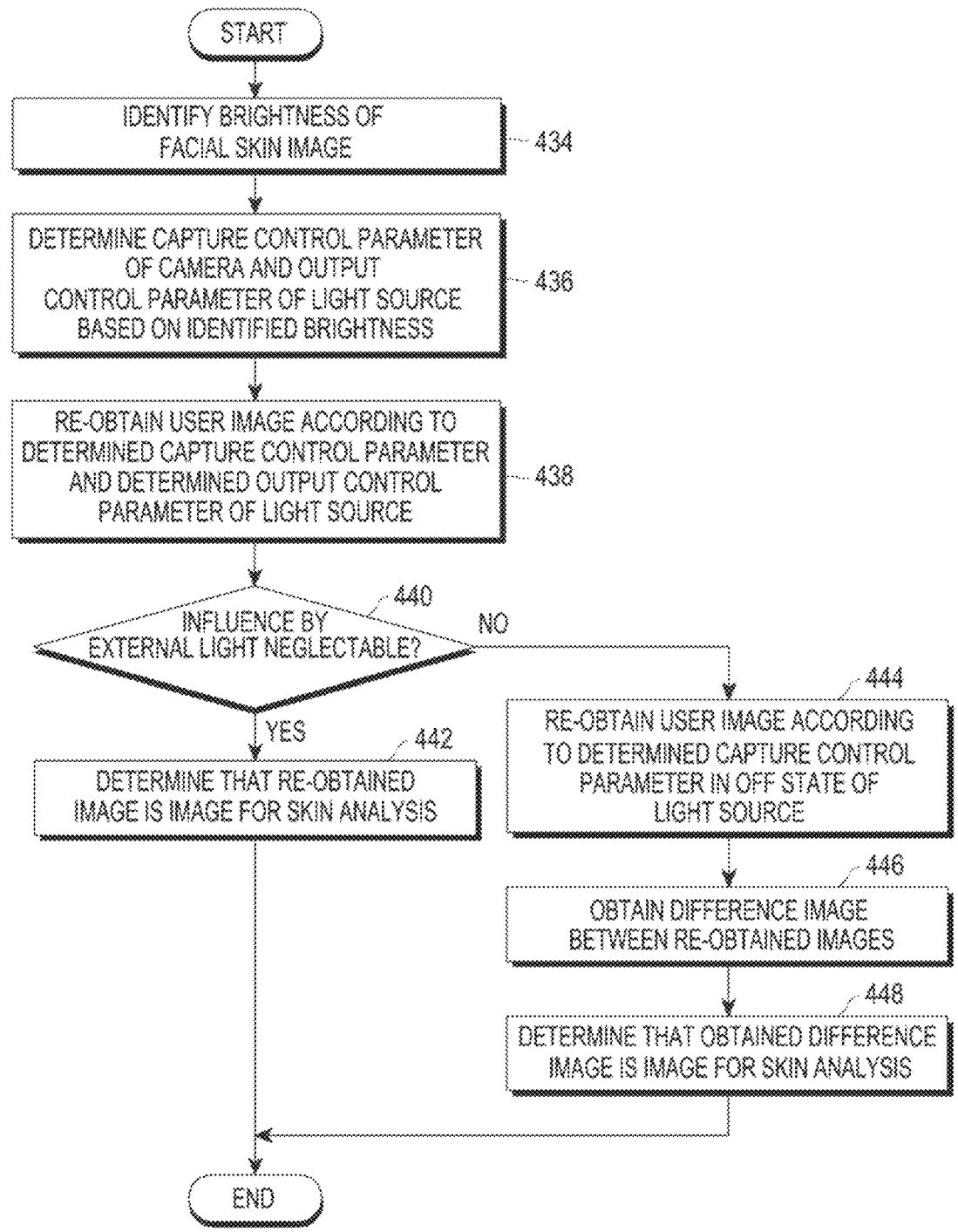
FIG. 4C is a view illustrating an example operation of re-obtaining a user image by controlling a camera and a light source according to an embodiment.

FIG. 4C is a view illustrating an example operation of re-obtaining a user image by controlling a camera 180 and a light source 171 according to an embodiment.

Referring to FIG. 4C, according to an embodiment, an electronic device (e.g., the electronic device 101 of FIG. 1A) may identify the brightness of the facial skin image based on a user image obtained by the camera (e.g., the camera 180 of FIG. 1A) in operation 434. The description made above in connection with FIG. 3C may apply likewise to operation 434.

According to an embodiment, the electronic device (e.g., the electronic device 101 of FIG. 1A) may determine the capture control parameter of the camera 180 and the output control parameter of the light source 171 based on the identified brightness in operation 436. According to an embodiment, the electronic device 101 may change the capture control parameter (e.g., exposure time) of the camera 180 from 1/80 seconds to 1/40 seconds and the output control parameter (e.g., quantity of light) of the light source 171 from 150 lux to 350 lux.

According to an embodiment, the electronic device (e.g., the electronic device 101 of FIG. 1A) may, in operation 438, re-obtain a user image according to the determined capture control parameter and the determined output control parameter.

According to an embodiment, the electronic device (e.g., the electronic device 101 of FIG. 1A) may, in operation 440, determine whether an influence by the external light (e.g., the external light 310 of FIG. 3B) is neglectable from the image obtained in operation 320. The description of operation 408 may apply likewise to operation 440. According to an embodiment, upon determining that an influence by the external light 310 is neglectable from the image obtained in operation 320 (yes in operation 440), the electronic device 101 may determine that the image re-obtained in operation 438 is a final image for skin analysis in operation 442.

According to an embodiment, upon determining that an influence by the external light 310 is not neglectable from the image obtained in operation 320 (no in operation 440), the electronic device 101 may re-obtain a user image 110 according to the determined capture control parameter (e.g., exposure time of 1/40 seconds) in the off state of the light source 171 in operation 444.

According to an embodiment, the electronic device 101 may obtain a difference image between the re-obtained images (e.g., the image re-obtained in operation 438 and the image re-obtained in operation 444) in operation 446. According to an embodiment, the electronic device 101 may obtain the difference image by computing a difference between the respective corresponding pixels of the images. According to an embodiment, various techniques for obtaining the difference image may be applicable to operation 446. According to an embodiment, an image freed from an influence by the external light 310 may be obtained by obtaining the difference image. According to an embodiment, the accuracy of skin analysis may be increased by obtaining the image freed from an influence by the external light 310.

According to an embodiment, the electronic device 101 may determine that the difference image obtained in operation 446 is a final image for skin analysis in operation 448.

Figure 5:
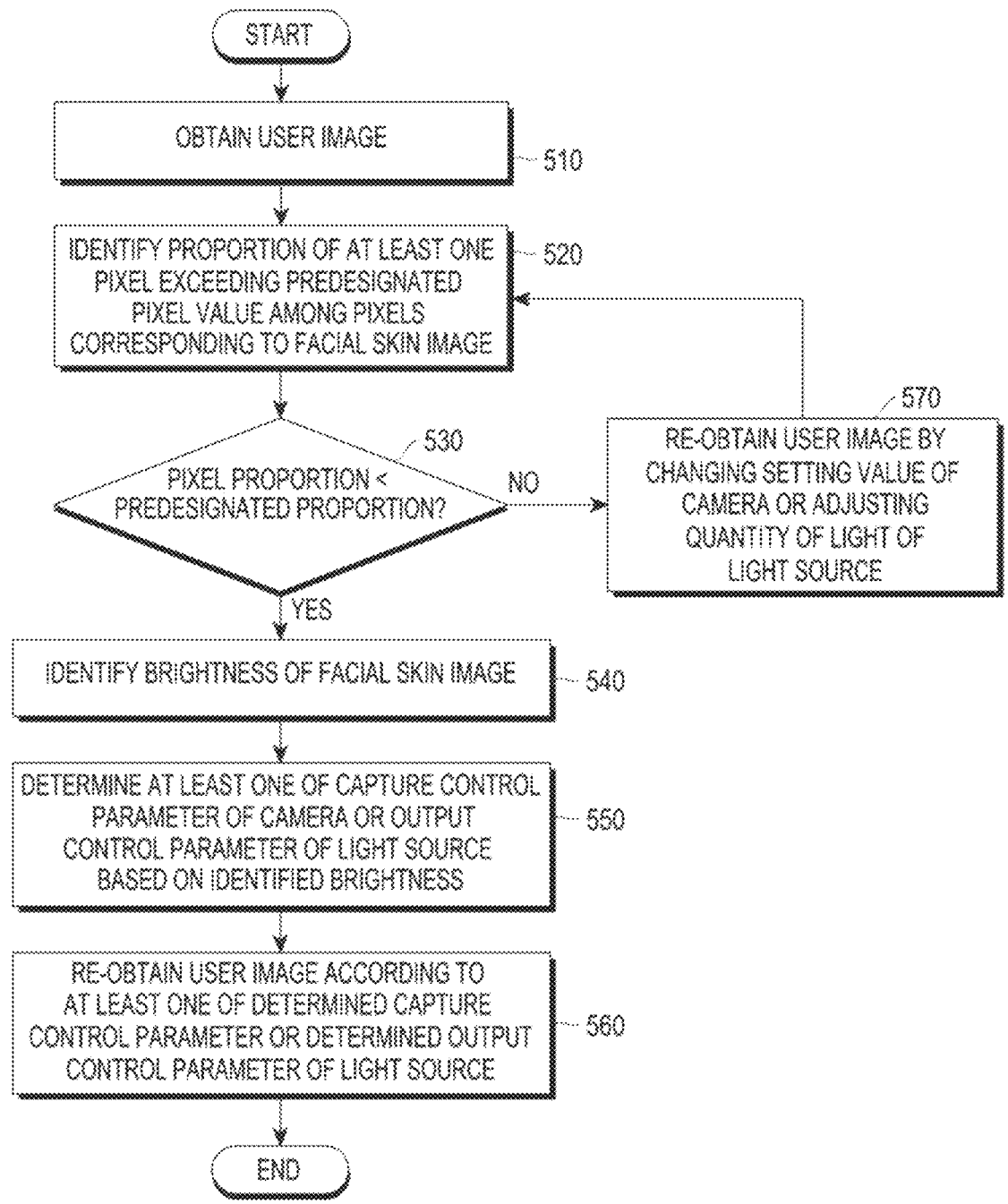
FIG. 5 is a view illustrating an example operation of determining whether to perform an operation of re-obtaining an image according to a proportion of saturated pixels according to an embodiment.

FIG. 5 is a view illustrating an example operation of determining whether to perform an operation of re-obtaining an image according to a proportion of saturated pixels according to an embodiment.

Referring to FIG. 5, according to an embodiment, an electronic device (e.g., the electronic device 101 of FIG. 1A) may obtain a user image 100 in operation 510.

According to an embodiment, the electronic device (e.g., the electronic device 101 of FIG. 1A) may identify a proportion of at least one pixel exceeding a predesignated pixel value (e.g., 255) among pixels corresponding to the facial skin image in operation 520. According to an embodiment, operation 520 may be replaced with an operation of determining whether a threshold pixel proportion exceeds a predesignated proportion. If the proportion of pixels exceeding the threshold pixel exceeds the predesignated proportion, it may be useless as information for skin analysis and, thus, the electronic device (e.g., the electronic device 101 of FIG. 1A) may perform operation 520 according to an embodiment.

As used herein, the phrase "predesignated pixel value (e.g., 255) among pixel values corresponding to facial skin image" may be referred to as a "threshold pixel" or "saturation pixel." According to an embodiment, operation 520 may mean the case where the mean brightness of the facial skin image is not less than a reference brightness.

According to an embodiment, the electronic device (e.g., the electronic device 101 of FIG. 1A) may determine whether the proportion of pixels according to operation 520 is less than a predesignated proportion (e.g., 0.01%) in operation 530.

According to an embodiment, if the pixel proportion according to operation 520 is less than the predesignated proportion (e.g., 0.01%) (yes in operation 530), the electronic device (e.g., the electronic device 101 of FIG. 1A) may identify the brightness of the facial skin image in operation 540.

According to an embodiment, if the pixel proportion according to operation 520 is not less than the predesignated proportion (e.g., 0.01%) (no in operation 530), the electronic device (e.g., the electronic device 101 of FIG. 1A) may re-obtain a user image 110 in operation 570. In this case, according to an embodiment, the electronic device 101 may change the settings of the camera (e.g., reduce exposure time) or adjust (e.g., reduce) the quantity of light of the light source 171 so as to obtain a darker image than the current image.

According to an embodiment, the electronic device (e.g., the electronic device 101 of FIG. 1A) may, in operation 550, determine at least one of the capture control parameter of the camera or the output control parameter of the light source 171 based on the brightness identified in operation 540.

According to an embodiment, the electronic device (e.g., the electronic device 101 of FIG. 1) may, in operation 560, re-obtain a user image according to at least one of the determined capture control parameter or the determined output control parameter of the light source 171. According to an embodiment, the electronic device 101 may determine that the image re-obtained in operation 560 is a final image for skin analysis.

Figure 6A:
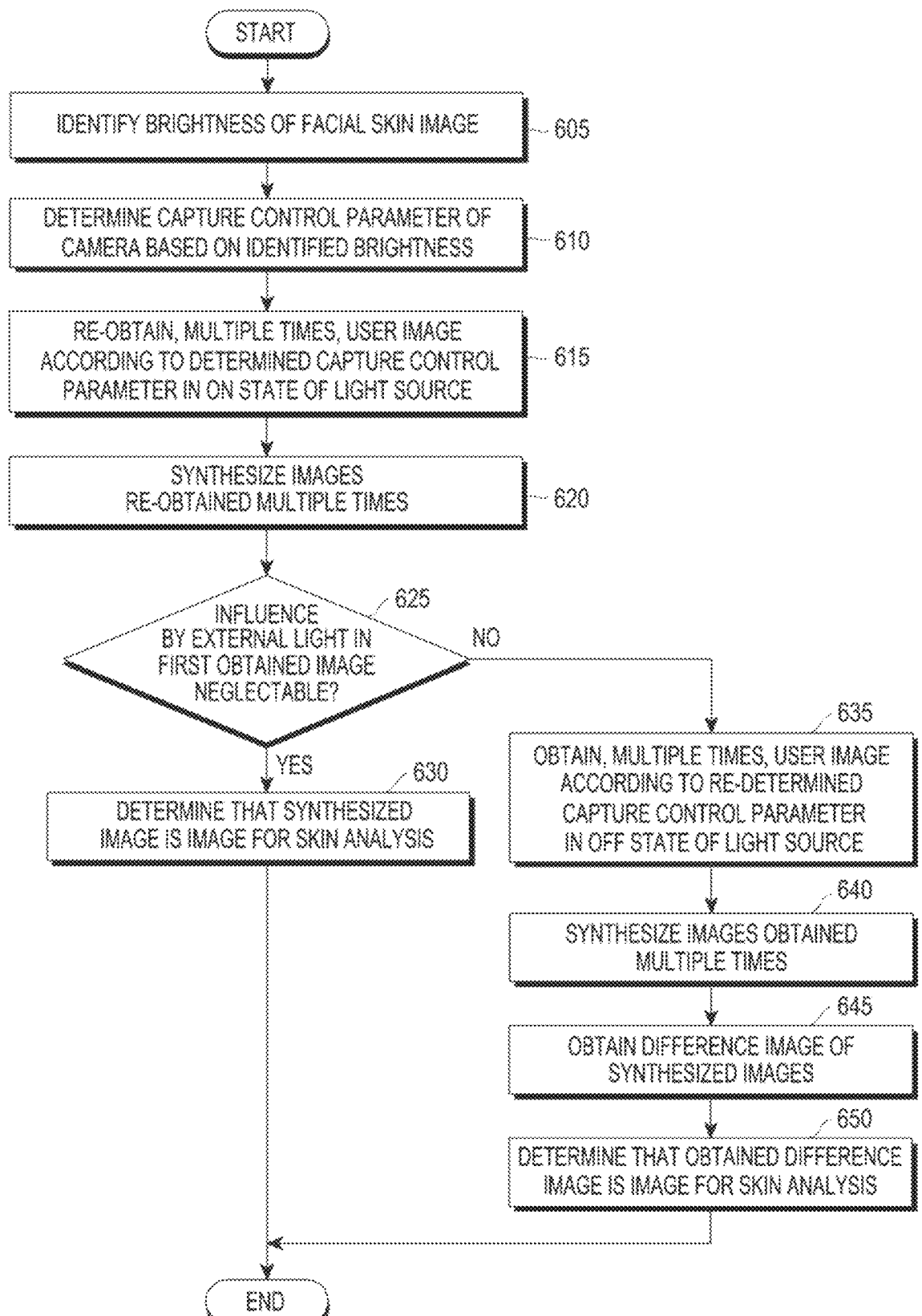
FIG. 6A is a view illustrating an example operation of obtaining a final image by synthesizing a plurality of images according to an embodiment.

FIG. 6A is a view illustrating an example operation of obtaining a final image by synthesizing a plurality of images according to an embodiment.

Referring to FIG. 6A, according to an embodiment, an electronic device (e.g., the electronic device 101 of FIG. 1A) may identify the brightness of the facial skin image based on a user image 110 obtained by the camera (e.g., the camera 120 of FIG. 1A) in operation 605. The description made above in connection with FIG. 3C may apply likewise to operation 605.

According to an embodiment, the electronic device (e.g., the electronic device 101 of FIG. 1A) may, in operation 610, determine the capture control parameter of the camera based on the brightness identified in operation 605. According to an embodiment, the electronic device 101 may determine (change) the capture control parameter (e.g., exposure time) of the camera (e.g., the camera 180 of FIG. 1A) from ⅟80 seconds to ⅟40 seconds.

According to an embodiment, the electronic device (e.g., the electronic device 101 of FIG. 1A) may re-obtain, multiple times, user images 110 according to the determine capture control parameter in the on state of the light source 171 in operation 615.

According to an embodiment, the electronic device (e.g., the electronic device 101 of FIG. 1A) may synthesize the images re-obtained multiple times in operation 620. According to an embodiment, the electronic device 101 may synthesize the multiple times re-obtained images by adding the respective corresponding pixel values of the images (e.g., the images obtained multiple times). For example, referring to FIG. 6B, according to an embodiment, the electronic device 101 may synthesize a plurality of images 600a, 600b, and 600c with the same brightness (e.g., 40). According to an embodiment, the electronic device 101 may obtain a brighter image 600d (e.g., its brightness is 120) by synthesizing the plurality of images 600a, 600b, and 600c with the same brightness (e.g., 40). According to an embodiment, various image synthesizing techniques may apply to operation 620.

According to an embodiment, the electronic device (e.g., the electronic device 101 of FIG. 1A) may, in operation 625, determine whether an influence by the external light is neglectable from the image obtained in operation 320. The description of operation 408 may apply likewise to operation 625.

According to an embodiment, upon determining that an influence by the external light is neglectable from the image obtained in operation 320 (yes in operation 625), the electronic device (e.g., the electronic device 101 of FIG. 1A) may determine that the synthesized image is a final image for skin analysis in operation 630.

According to an embodiment, upon determining that an influence by the external light is not neglectable from the image obtained in operation 320 (no in operation 625), the electronic device (e.g., the electronic device 101 of FIG. 1A) may obtain, multiple times (e.g., five times), a user image 110 according to the capture control parameter (e.g., exposure time of ⅟40 seconds), determined in operation 610, in the off state of the light source 171 in operation 635.

According to an embodiment, the electronic device (e.g., the electronic device 101 of FIG. 1A) may synthesize the images obtained multiple times in operation 640. According to an embodiment, various image synthesizing techniques may apply to operation 645. According to an embodiment, an image with enhanced brightness (or resolution) may be obtained by synthesizing the plurality of images.

According to an embodiment, the electronic device (e.g., the electronic device 101 of FIG. 1A) may obtain a difference image between the synthesized images in operation 645. According to an embodiment, the synthesized images may mean images synthesized in operations 620 and 640. Various techniques for obtaining a difference image between a plurality of images may apply to operation 645. According to an embodiment, an image freed from influence by the external light may be obtained by obtaining the difference image between the synthesized images and, thus, an image for enhanced skin analysis accuracy may be obtained.

According to an embodiment, the electronic device (e.g., the electronic device 101 of FIG. 1A) may determine that the obtained difference image is a final image for skin analysis in operation 650.

Figure 6B:
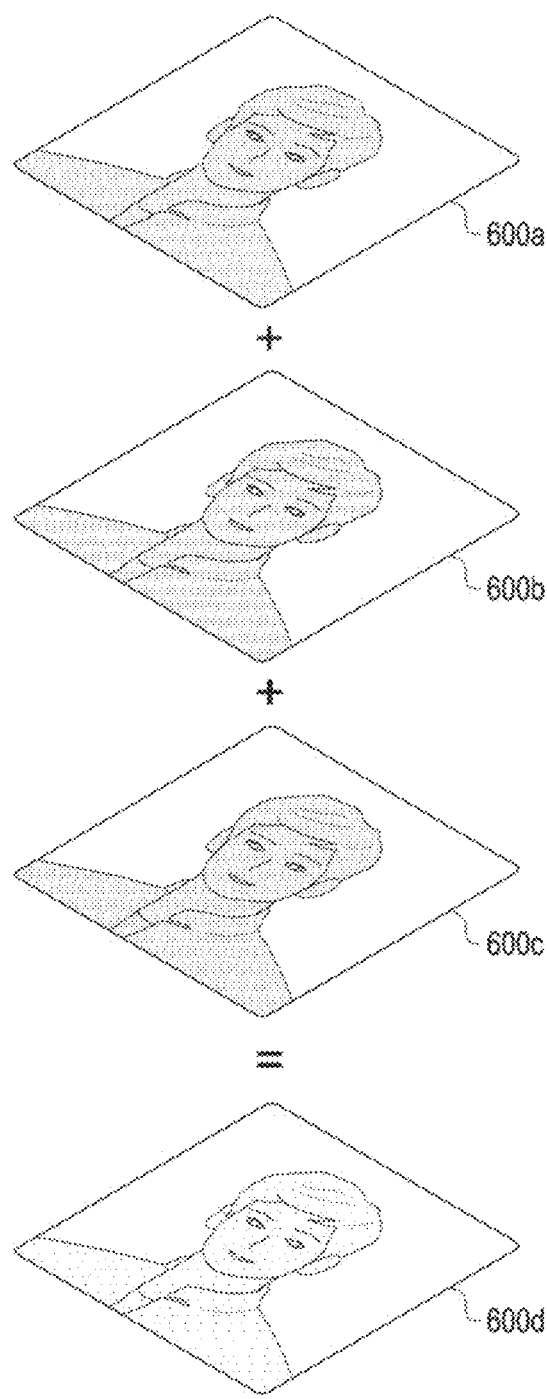
FIG. 6B is a view illustrating an example operation of synthesizing a plurality of images according to an embodiment.

FIG. 6B is a view illustrating an example operation of synthesizing a plurality of images 600a, 600b, and 600c according to an embodiment.

According to an embodiment, the electronic device 101 may obtain the plurality of images 600a, 600b, and 600c. According to an embodiment, the plurality of images may include images captured and obtained under the same capturing condition (e.g., exposure time of ⅟12 seconds). According to an embodiment, the electronic device 101 may compute the sum of pixel values for the respective corresponding pixels of the plurality of images 600a, 600b, and 600c. According to an embodiment, the electronic device 101 may generate an image including the computed pixel value sum. Thus, an image with increased brightness (or resolution) may be obtained. However, the function or operation of generating the synthesized image is merely an example, and other various techniques may apply to increase the brightness (or resolution) of the image.

Figure 7:
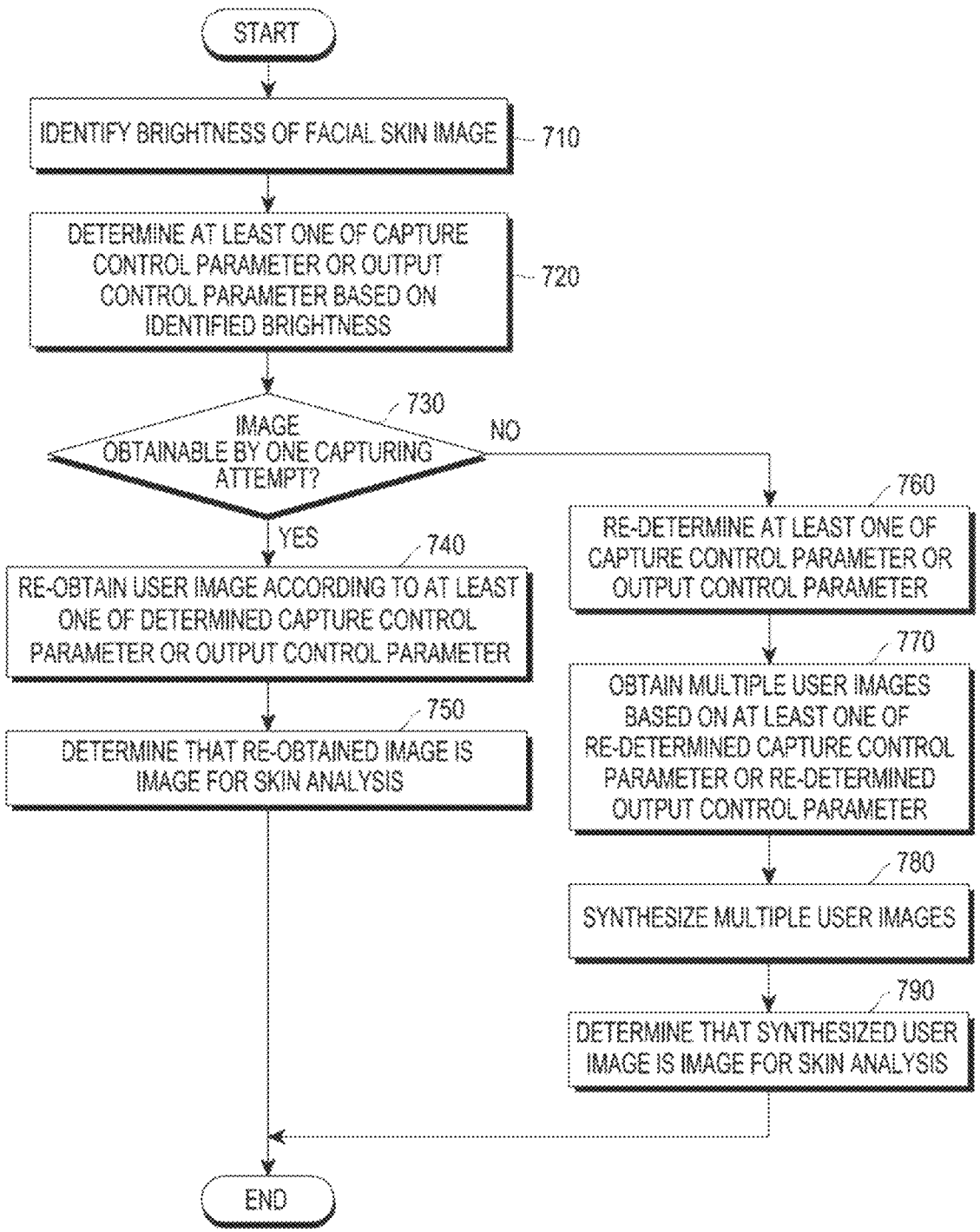
FIG. 7 is a view illustrating an example operation of obtaining a final image by synthesizing a plurality of images when an image to be re-obtained exceeds a pixel value limit of a camera according to an embodiment.

FIG. 7 is a view illustrating an example operation of obtaining a final image by synthesizing a plurality of images when an image to be re-obtained exceeds a pixel value limit of a camera according to an embodiment.

Referring to FIG. 7, according to an embodiment, an electronic device (e.g., the electronic device 101 of FIG. 1A) may identify the brightness of the facial skin image based on a user image obtained by the camera (e.g., the camera 180 of FIG. 1A) in operation 710. The description made above in connection with FIG. 3C may apply likewise to operation 710.

According to an embodiment, the electronic device (e.g., the electronic device 101 of FIG. 1A) may, in operation 720, determine at least one of the capture control parameter of the camera 180 or the output control parameter of the light source 171 based on the identified brightness. According to an embodiment, the electronic device 101 may change the capture control parameter (e.g., exposure time) of the camera 180 from ⅟80 seconds to ⅟40 seconds and the output control parameter (e.g., quantity of light) of the light source 171 from 150 lux to 350 lux.

According to an embodiment, the electronic device (e.g., the electronic device 101 of FIG. 1A) may determine whether an image (e.g., a final image) may be obtained by one capturing attempt in operation 730. If among the images obtained in operation 710, the facial skin image obtained in the off state of the light source 171 has a brightness of 100, and the facial skin image obtained in the on state of the light source 171 has a brightness of 150, the identified brightness of the facial skin image may be computed as 50. In this case, the exposure time of the camera 180 may be determined to be $1/30$ seconds, or the quantity of light output from the light source 171 may be determined to be 500 lux so as to obtain an image with the target brightness (e.g., 150). However, if the image is obtained under such a condition, the brightness of the facial skin image obtained in the on state of the light source 171 may increase to 450 which may exceed the threshold pixel value (e.g., 255) of the camera 180. According to an embodiment, the electronic device 101 may determine that such occasion is the case where it is impossible to obtain an image (e.g., a final image) by one capturing attempt. As another example, if among the images obtained in operation 710, the facial skin image obtained in the off state of the light source 171 has a brightness of 20, and the facial skin image obtained in the on state of the light source 171 has a brightness of 100, the identified brightness of the facial skin image may be computed as 80. In this case, the exposure time of the camera 180 may be determined to be $1/28$ seconds, or the quantity of light output from the light source 171 may be determined to be 533 lux so as to obtain an image with the target brightness (e.g., 160). According to an embodiment, the camera 180 and/or the light source 171 may be controlled so that the capturing condition is varied to allow the brightness of the captured facial skin image to double the setting value of the camera 180 and/or light source 171 used in operation 710 to thereby reach the target brightness. If the image is obtained under such a condition, the brightness of the facial skin image obtained in the on state of the light source 171 increases to 200 but may be avoided from exceeding the threshold pixel value (e.g., 255) of the camera 180. According to an embodiment, the electronic device 101 may determine that such occasion is the case where it is possible to obtain an image (e.g., a final image) by one capturing attempt.

According to an embodiment, upon determining that an image (e.g., a final image) may be obtained by one capturing attempt, the electronic device (e.g., the electronic device 101 of FIG. 1) may, in operation 740, re-obtain a user image according to at least one of the capture control parameter or the output control parameter of the light source 171 determined in operation 720.

According to an embodiment, the electronic device (e.g., the electronic device 101 of FIG. 1A) may, in operation 750, determine that the image re-obtained in operation 740 is the final image.

According to an embodiment, upon determining that an image (e.g., a final image) may not be obtained by one capturing attempt, the electronic device (e.g., the electronic device 101 of FIG. 1) may, in operation 760, re-determine at least one of the capture control parameter or the output control parameter of the light source 171. According to an embodiment, the electronic device 101 may re-determine the capture control parameter according to the number (e.g., 5) of images to be obtained. For example, according to an embodiment, the electronic device 101 may change the exposure time from $1/12$ seconds to $1/60$ seconds if the number of images to be obtained is five. According to an embodiment, the number of images to be obtained may be predesignated.

According to an embodiment, the electronic device (e.g., the electronic device 101 of FIG. 1A) may obtain a plurality of images based on at least one of the re-determined capture control parameter or the re-determined output control parameter of the light source 171 in operation 770.

According to an embodiment, the electronic device (e.g., the electronic device 101 of FIG. 1A) may, in operation 780, synthesize a plurality of user images obtained in operation 770.

According to an embodiment, the electronic device (e.g., the electronic device 101 of FIG. 1A) may determine that the user image synthesized in operation 780 is the final image in operation 790.

Figure 8:
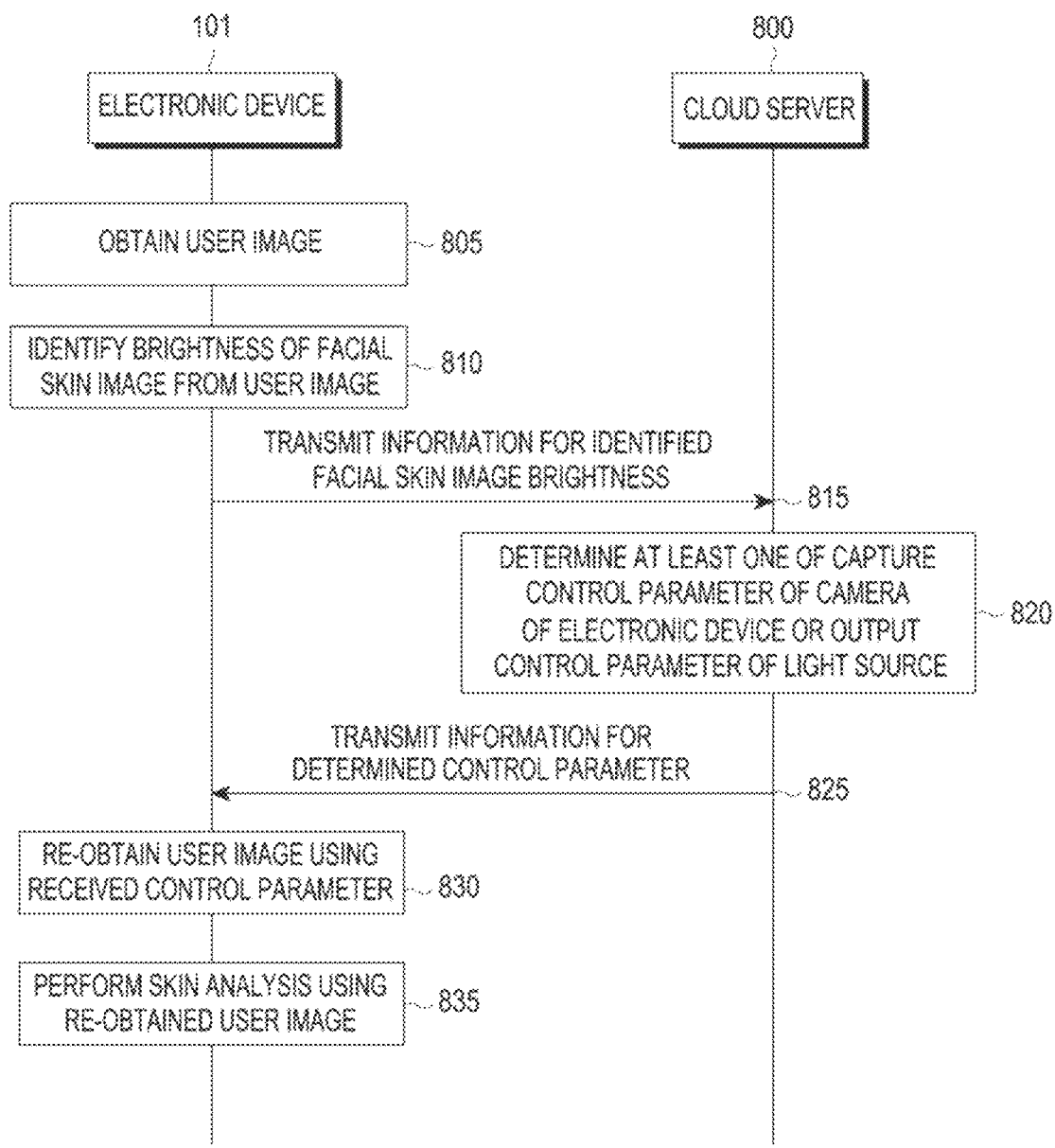
FIG. 8 is a view illustrating an example function or operation of obtaining a control parameter from a cloud server according to an embodiment.

FIG. 8 is a view illustrating an example function or operation of obtaining a capture control parameter or an output control parameter of a light source from a cloud server 800 according to an embodiment.

Referring to FIG. 8, according to an embodiment, an electronic device 101 may obtain a user image in operation 805.

According to an embodiment, the electronic device 101 may identify the brightness of the facial skin image from the obtained user image in operation 810. According to an embodiment, the description of operation 210 may apply likewise to operation 810. According to an embodiment, the electronic device 101 may transmit the image obtained in operation 805 to the cloud server 800 so that an operation corresponding to operation 810 is performed by the cloud server 800 according to an embodiment.

According to an embodiment, the electronic device 101 may transmit information for the brightness of the facial skin image identified in operation 815 to the cloud server 800.

According to an embodiment, upon receiving the identified brightness of the facial skin image from the electronic device 101, the cloud server 800 may determine a capture control parameter for controlling the camera 180 of the electronic device 101 and/or an output control parameter for controlling the light source 171 of the electronic device 101 in operation 820. According to an embodiment, information for Tables 1 to 3, information for Equations 3 to 5, and information for hardware specifications (e.g., camera and lighting specifications) for various devices including the electronic device 101 may be stored in the cloud server 800. According to an embodiment, the cloud server 800 may determine the capture control parameter for controlling the camera 180 of the electronic device 101 and/or the output control parameter for controlling the light source 171 of the electronic device 101 using the information stored in the cloud server 800 (e.g., information for Tables 1 to 3, information for Equations 3 to 5, and/or information for hardware specifications (e.g., camera and lighting specifications) for various devices including the electronic device 101). According to an embodiment, the cloud server 800 may store information for ranges (e.g., the target brightness) in which skin analysis accuracy may be increased.

According to an embodiment, the cloud server 800 may transmit range information for increasing skin analysis accuracy to the electronic device 101 to allow the electronic device 101 to perform operation 820, and the electronic device 101 and the cloud server 800 may refrain from performing operations 815 and 825.

According to an embodiment, the cloud server 800 may transmit information for the control parameter determined in operation 820 to the electronic device 101 in operation 825.

According to an embodiment, the electronic device 101 may re-obtain a user image using the control parameter received from the cloud server 800 in operation 830.

According to an embodiment, in operation 835, the electronic device 101 may perform skin analysis using the re-obtained user image, or according to an embodiment, the electronic device 101 may transmit the re-obtained user image to the cloud server 800 for skin analysis.

In a modified embodiment regarding the method of identifying the brightness of the facial skin image (e.g., the operations of FIG. 3A), the user image may be obtained, with the light source 171 set to a designated brightness (e.g., 10 lux) rather than being completely turned off in the user image obtaining operation (corresponding to operation 320 of FIG. 3A). In this case, when the user image is obtained in the on state of the light source 171 (corresponding to operation 330 of FIG. 3A), the quantity of light of the light source 171 may be output, with the output parameter of the light source 171 added to the brightness (e.g., 10 lux) used in the prior step. In a modified embodiment regarding the method of re-obtaining a user image with the "target brightness" (corresponding to the operations subsequent to operation 406 of FIG. 4A), if the user image is re-obtained, with the light source 171 set to a designated brightness (e.g., 10 lux) rather than being fully turned off (which corresponds to operation 412 of FIG. 4A), the user image may be re-obtained (corresponding to operation 406 of FIG. 4A), with a designated brightness (e.g., 10 lux) added to the capture control parameter or output control parameter determined according to Tables 1 to 3 or Equations 3 to 5.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, there may be provided an electronic device and a method of controlling the electronic device for obtaining images free from influence by an external light in obtaining skin images when the external light is positioned around the target person for skin measurement.

According to various embodiments, it is possible to obtain images with a proper brightness (e.g., a designated brightness range) for skin analysis.

The effects set forth herein are not limited thereto, and it is apparent to one of ordinary skill in the art that various effects may be disclosed herein.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device, comprising:
at least one camera;
at least one light source; and
at least one processor configured to:
control the at least one camera to capture a user image,
identify a brightness of a facial skin image from the user image based on a difference between a first user image obtained when the at least one light source is in an on state and a second user image obtained when the at least one light source is in an off state,
determine whether the brightness of the facial skin image is included in a predesignated target brightness range,
when the brightness of the facial skin image is out of the predesignated target brightness range, calculate, for obtaining a final image having a predesignated target brightness with respect to the facial skin image, a proportion between the predesignated target brightness and the identified brightness, wherein the predesignated target brightness is a brightness value included in the predesignated target brightness range,
determine at least one of a capture control parameter of the at least one camera or an output control parameter of the at least one light source, based on the calculated proportion,
control the at least one camera to recapture, multiple times, the user image according to the determined at least one of the capture control parameter or the output control parameter of the at least one light source, to obtain a plurality of recaptured user images,
synthesize the plurality of recaptured user images, into one image, and
store the synthesized one image as the final image.

2. The electronic device of claim 1, wherein the at least one processor is further configured to obtain the first user image in the on state of the at least one light source and the second user image in the off state of the at least one light source as the recaptured user image.

3. The electronic device of claim 2, wherein the at least one processor is further configured to determine whether the second user image obtained in the off state of the at least one light source meets an external light neglecting condition and, when the external light neglecting condition is met, determine that the first user image obtained in the on state of the at least one light source is an image for skin analysis.

4. The electronic device of claim 2, wherein the at least one processor is further configured to determine whether the second user image obtained in the off state of the at least one light source meets an external light neglecting condition and, when the external light neglecting condition is not met, control the at least one camera to recapture the user image according to the capture control parameter in the off state of the at least one light source.

5. The electronic device of claim 4, wherein the at least one processor is further configured to obtain an image for skin analysis by comparing the first user image recaptured in the on state of the at least one light source with the second user image recaptured according to the capture control parameter in the off state of the at least one light source.

6. The electronic device of claim 1, wherein the at least one processor is further configured to determine a proportion of at least one pixel exceeding a predesignated pixel value among pixels corresponding to at least a portion of the second user image obtained in the off state of the at least one light source.

7. The electronic device of claim 6, wherein the at least one processor is further configured to perform an operation of identifying the brightness of the facial skin image when the proportion of the at least one pixel is less than a predesignated proportion.

8. The electronic device of claim 6, wherein the at least one processor is further configured to re-perform an operation of identifying the brightness of the user image when the proportion of the at least one pixel is not less than a predesignated proportion.

9. The electronic device of claim 2, wherein when a pixel value of at least one pixel among pixels included in the user image to be recaptured exceeds a threshold pixel value of the at least one camera, the at least one processor is further configured to re-determine the capture control parameter, obtain a plurality of user images based on the re-determined capture control parameter, and obtain an image for skin analysis by synthesizing the plurality of user images.

10. A method of controlling an electronic device comprising at least one camera and at least one light source, the method comprising:
controlling the at least one camera to capture a user image;
identifying a brightness of a facial skin image from the user image by comparing a first user image obtained when the at least one light source is in an on state with a second user image obtained when the at least one light source is in an off state;
determining whether the brightness of the facial skin image is included in a predesignated target brightness range,
when the brightness of the facial skin image is out of the predesignated target brightness range, calculating, for obtaining a final image having a predesignated target brightness with respect to the facial skin image, a proportion between the predesignated target brightness and the identified brightness, wherein the predesignated target brightness is a brightness value included in the predesignated target brightness range,
determining at least one of a capture control parameter of the at least one camera or an output control parameter of the at least one light source, based on the calculated proportion;
controlling the at least one camera to recapture, multiple times, the user image according to the determined at least one of the capture control parameter or the output control parameter, to obtain a plurality of recaptured user images,
synthesize the plurality of recaptured user images into one image, and
storing the synthesized one image as the final image.

11. The method of claim 10, further comprising:
determining whether the second user image obtained in the off state of the at least one light source meets an external light neglecting condition; and
when the external light neglecting condition is met, determining that the recaptured user image is an image for skin analysis.

12. The method of claim 10, further comprising:
determining whether the second user image obtained in the off state of the at least one light source meets an external light neglecting condition; and
when the external light neglecting condition is not met, controlling the at least one camera to recapture the user image according to the capture control parameter in the off state of the at least one light source.

13. The method of claim 12, further comprising obtaining an image for skin analysis by comparing the first user image recaptured in the on state of the at least one light source with the second user image recaptured according to the capture control parameter in the off state of the at least one light source.

14. The method of claim 10, further comprising determining a proportion of at least one pixel exceeding a predesignated pixel value among pixels corresponding to at least a portion of the user image obtained in the off state of the at least one light source.

15. The method of claim 14, wherein an operation of identifying the brightness of the facial skin image is performed when the proportion of the at least one pixel is less than a predesignated proportion.

* * * * *